United States Patent
Akiyama

(10) Patent No.: US 9,182,647 B2
(45) Date of Patent: Nov. 10, 2015

(54) CONTROL METHOD OF OPTICAL ELEMENT

(71) Applicants: FUJITSU LIMITED, Kawasaki-shi, Kanagawa (JP); Photonics Electronics Technology Research Association, Bunkyo-ku, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 14/609,809

(22) Filed: Jan. 30, 2015

(65) Prior Publication Data
US 2015/0261061 A1    Sep. 17, 2015

(30) Foreign Application Priority Data
Mar. 17, 2014    (JP) ................................ 2014-053947

(51) Int. Cl.
| G02F 1/01 | (2006.01) |
| G02F 1/035 | (2006.01) |
| G02F 1/225 | (2006.01) |
| G02B 6/293 | (2006.01) |
| G02B 6/12 | (2006.01) |

(52) U.S. Cl.
CPC ............ *G02F 1/225* (2013.01); *G02B 6/12007* (2013.01); *G02B 6/2938* (2013.01); *G02B 6/29338* (2013.01); *G02F 1/0121* (2013.01)

(58) Field of Classification Search
None
See application file for complete search history.

(56) References Cited

U.S. PATENT DOCUMENTS

| 2005/0074194 A1* | 4/2005 | Tan et al. ........................... 385/1 |
| 2010/0200733 A1* | 8/2010 | McLaren et al. ........... 250/214 C |
| 2010/0329685 A1* | 12/2010 | Zheng et al. .................... 398/83 |
| 2013/0161496 A1 | 6/2013 | Akiyama |

FOREIGN PATENT DOCUMENTS

| JP | H05-347452 | 12/1993 |
| JP | 2013-026543 A1 | 2/2013 |
| JP | 2013-130738 A1 | 7/2013 |

OTHER PUBLICATIONS

Q. Xu, et al.; "Cascaded silicon micro-ring modulators for WDM optical interconnection;" Optics Express; vol. 14; No. 20; Oct. 2, 2006; pp. 9430-9435 (6 Sheets).

* cited by examiner

*Primary Examiner* — Ryan Lepisto
*Assistant Examiner* — Erin Chiem
(74) *Attorney, Agent, or Firm* — Kratz, Quintos & Hanson, LLP

(57) ABSTRACT

A control method of an optical element, including light sources to emit lights having different wavelengths from each other, and ring modulators connected in cascade along a light waveguide, is disclosed. Each ring modulator includes a ring resonator, and a wavelength adjustment electrode to adjust a resonance wavelength in the ring resonator, wherein the lights from the light sources are multiplexed to enter the light waveguide. The method includes having a light source emit the light; adjusting power to the wavelength adjustment electrode in each ring modulator, to obtain a value of the power causing the resonance wavelength of the ring resonator, equivalent to the wavelength of the light emitted from the light source; obtaining a relationship between the light sources and the values of the power corresponding to the ring modulators; and selecting the ring modulators corresponding to the light sources based on the relationship.

14 Claims, 18 Drawing Sheets

FIG.6

| | RM1 | RM2 | RM3 | RM4 | RM5 | RM6 | RM7 | RM8 |
|---|---|---|---|---|---|---|---|---|
| LD1 | 4.7 | 0.2 | | | | | 13.1 | 11.4 |
| LD2 | 12.2 | 7.3 | 0.7 | | | | | 18.9 |
| LD3 | 16.4 | 11.5 | 4.8 | 1.2 | | | | |
| LD4 | | 19.0 | 12.3 | 8.7 | 0.6 | | | |
| LD5 | | | 17.7 | 14.0 | 5.9 | 2.5 | | |
| LD6 | | | | 19.7 | 11.0 | 8.1 | | |
| LD7 | 0.2 | | | | 18.7 | 15.2 | 3.6 | 3.8 |
| LD8 | | | | | | 18.3 | 8.6 | 6.9 |

ONLY LD2 EMITS LIGHT, HEATER POWER OF RM2 IS SWEPT, AND MONITORED HEATER POWER $P_{peak}$ IS STORED.

A DIAGONAL SEQUENCE WITHOUT BLANKS HAVING LOWEST POWER IS SELECTED TO ALLOCATE RING WAVELENGTH.

FIG.10

|     | RM1  | RM2  | RM3  | RM4  | RM5  | RM6  | RM7  | RM8  |
|-----|------|------|------|------|------|------|------|------|
| LD1 |      |      | 6.2  |      | 14.7 |      | 2.8  |      |
| LD2 |      |      | 9.2  |      |      |      | 5.8  |      |
| LD3 |      |      | 12.4 |      |      |      | 9.1  |      |
| LD4 |      |      |      |      |      |      | 12.5 | 3.3  |
| LD5 | 2.3  | 3.7  |      | 3.7  |      | 1.1  |      | 7.2  |
| LD6 | 6.2  | 7.6  |      | 7.7  | 2.3  | 5.1  |      | 11.2 |
| LD7 | 9.5  | 10.9 |      | 11.0 | 5.6  | 8.4  |      | 14.5 |
| LD8 | 13.7 |      | 1.3  |      | 9.8  | 12.6 |      |      |

FIG.11

EXCHANGE COLUMNS TO MAKE ELEMENTS IN THE SAME ROW MONOTONICALLY DECREASING

|     | RM1  | RM2  | RM3  | RM4  | RM5  | RM6  | RM7  | RM8  |
|-----|------|------|------|------|------|------|------|------|
| LD1 |      |      |      |      |      | 14.7 | 6.2  | 2.8  |
| LD2 |      |      |      |      |      |      | 9.2  | 5.8  |
| LD3 |      |      |      |      |      |      | 12.4 | 9.1  |
| LD4 | 3.3  |      |      |      |      |      |      | 12.5 |
| LD5 | 7.2  | 3.7  | 3.7  | 2.3  | 1.1  |      |      |      |
| LD6 | 11.2 | 7.7  | 7.6  | 6.2  | 5.1  | 2.3  |      |      |
| LD7 | 14.5 | 11.0 | 10.9 | 9.5  | 8.4  | 5.6  |      |      |
| LD8 |      |      |      | 13.7 | 12.6 | 9.8  | 1.3  |      |

(BOLD FACES INDICATE 5 OR LESS)

|     | RM1  | RM2  | RM3  | RM4  | RM5  | RM6  | RM7  | RM8  |
|-----|------|------|------|------|------|------|------|------|
| LD1 | 5.0  |      |      |      |      |      | 10.3 | 4.2  |
| LD2 | 8.5  | 2.5  |      |      |      |      | 13.9 | 7.8  |
| LD3 | 11.8 | 5.8  | 3.0  |      |      |      |      | 11.1 |
| LD4 |      | 9.4  | 6.6  | 3.3  |      |      |      | 14.7 |
| LD5 |      | 14.1 | 11.3 | 8.0  | 2.9  | 0.6  |      |      |
| LD6 |      |      | 14.7 | 11.4 | 6.2  | 3.9  |      |      |
| LD7 |      |      |      |      | 10.8 | 8.6  | 3.5  |      |
| LD8 | 1.0  |      |      |      | 13.7 | 11.5 | 6.4  | 0.3  |

DELETE ELEMENTS BELOW CERTAIN VALUE

|     | RM1  | RM2  | RM3  | RM4  | RM5  | RM6  | RM7  | RM8  |
|-----|------|------|------|------|------|------|------|------|
| LD1 |      |      |      |      |      |      | 10.3 |      |
| LD2 | 8.5  |      |      |      |      |      | 13.9 | 7.8  |
| LD3 | 11.8 | 5.8  |      |      |      |      |      | 11.1 |
| LD4 |      | 9.4  | 6.6  |      |      |      |      | 14.7 |
| LD5 |      | 14.1 | 11.3 | 8.0  |      |      |      |      |
| LD6 |      |      | 14.7 | 11.4 | 6.2  |      |      |      |
| LD7 |      |      |      |      | 10.8 | 8.6  |      |      |
| LD8 | 1.0  |      |      |      | 13.7 | 11.5 | 6.4  |      |

FIG.18

|  | ECM (External Control Mode) | ICM (Internal Control Mode) | | |
|---|---|---|---|---|
|  |  | PEAKING ICM | FIXED-VALUE ICM | AVOIDANCE ICM |
| OPERATION | SET HEATER OUTPUT AT HEATER VALUE SET BY MCU, AND OUTPUT MONITOR VALUE TO MCU | CONTROL HEATER OUTPUT SO THAT MONITOR VALUE IS MAXIMIZED BY ONLY EIC | CONTROL HEATER OUTPUT BY ONLY EIC SO THAT MONITOR VALUE TAKES VALUE SET BY MCU | CONTROL HEATER BY ONLY EIC SO THAT MONITOR VALUE IS LOWERED WHEN TAKING A CERTAIN VALUE OR GREATER |
| USAGE | SWEEP HEATER MAINLY BY MCU WHEN GENERATING PPM, AND SET WITH HEATER VALUE OF PPM MAINLY BY MCU DETECTING PEAK | NORMAL OPERATION OF RING DEMULTIPLEXER (PPM CORRECTION) | APM CONTROL OF RING MODULATOR | AVOID CUTTING OFF LASER LIGHT BY UPPER RINGS |
| RING MODULATOR CONTROLLER | AVAILABLE | AVAILABLE | AVAILABLE | AVAILABLE |
| RING DEMULTIPLEXER CONTROLLER | AVAILABLE | AVAILABLE | NOT AVAILABLE | AVAILABLE |

FIG. 19

CONTROL METHOD OF OPTICAL ELEMENT

CROSS-REFERENCE TO RELATED APPLICATIONS

This application is based upon and claims the benefit of priority of the prior Japanese Priority Application No. 2014-053947 filed on Mar. 17, 2014, the entire contents of which are hereby incorporated by reference.

FIELD

The disclosures herein generally relate to a control method of an optical element.

BACKGROUND

As one of optical communication technologies, there has been a large-capacity optical fiber communication system that uses a wavelength division multiplexing (WDM) technology. In such a large-capacity optical fiber communication system that uses a wavelength division multiplexing (WDM) technology, light signals formed by multiple light sources having different wavelengths are transmitted as WDM signals in an optical fiber, which makes large-capacity communication possible. Namely, such WDM signals are transmitted so that signals having wavelengths different from each other are transmitted as signal components of independent channels, respectively, and hence, large-capacity communication is realized. A wavelength division multiplexing communication apparatus that uses such a wavelength division multiplexing technology includes demultiplexers to separate signal components corresponding to respective wavelengths in an optical fiber, and modulators to generate signal components corresponding to the respective wavelengths to be input into the optical fiber.

RELATED-ART DOCUMENTS

Patent Documents

[Patent Document 1] Japanese Laid-open Patent Publication No. 2013-130738
[Patent Document 2] Japanese Laid-open Patent Publication No. 5-347452
[Patent Document 3] Japanese Laid-open Patent Publication No. 2013-26543
[Patent Document 4] Pending U.S. Patent Application No. 2010/0329685

As a modulator used for the wavelength division multiplexing communication apparatus described above, there is a ring modulator having a ring-type waveguide formed, and as a demultiplexer, there is a ring demultiplexer having a ring-type waveguide formed. Such a ring modulator and a ring demultiplexer are considered to be advantageous to downsizing or reducing power consumption, and high-density packaging including such a ring modulator and a ring demultiplexer as optical elements realizes a small-sized, large-capacity wavelength division multiplexing communication apparatus. Incidentally, there are cases where such a ring modulator and a ring demultiplexer are not manufactured to have a desired resonance wavelength due to manufacturing errors or the like, and/or the resonance wavelength fluctuates due to temperature change depending on the environment or the like. Therefore, resonance wavelengths in ring modulators and ring demultiplexers need to be allocated and adjusted to correspond to wavelengths of light emitted from light sources.

Therefore, a control method of an optical element has been desired, which can allocate and adjust resonance wavelengths in optical elements, or multiple ring modulators and multiple ring demultiplexers, to have the wavelengths corresponded with wavelengths of light emitted from light sources.

SUMMARY

According to at least one embodiment of the present invention, a control method of an optical element includes a plurality of light sources configured to emit lights having different wavelengths from each other, and a plurality of ring modulators configured to be connected in cascade along a light waveguide, wherein each of the ring modulators includes a ring resonator, and a wavelength adjustment electrode configured to adjust a resonance wavelength in the ring resonator, wherein the lights emitted from the light sources are multiplexed to be incident on the light waveguide, the method including having one of the light sources emit the light; adjusting power to be supplied to the wavelength adjustment electrode in each of the ring modulators, to obtain a value of the power causing the resonance wavelength of the ring resonator in the one of the ring modulators, to be equivalent to the wavelength of the light emitted from the one of the light sources; obtaining a relationship between the light sources and the values of the power corresponding to the ring modulators; and selecting the ring modulators corresponding to the light sources based on the relationship between the light sources and the values of the power.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 6 is an explanatory diagram (4) of a control method of optical elements according to the first embodiment;
FIG. 10 is an explanatory diagram (2) of a control method of optical elements according to the second embodiment;
FIG. 11 is an explanatory diagram (3) of a control method of optical elements according to the second embodiment.

FIG. 18 is an explanatory diagram of a control method of optical elements according to the eighth embodiment; and FIG. 19 is a control sequence chart of a control method of optical elements according to a ninth embodiment of the present invention.

DESCRIPTION OF EMBODIMENTS

Figure 1:
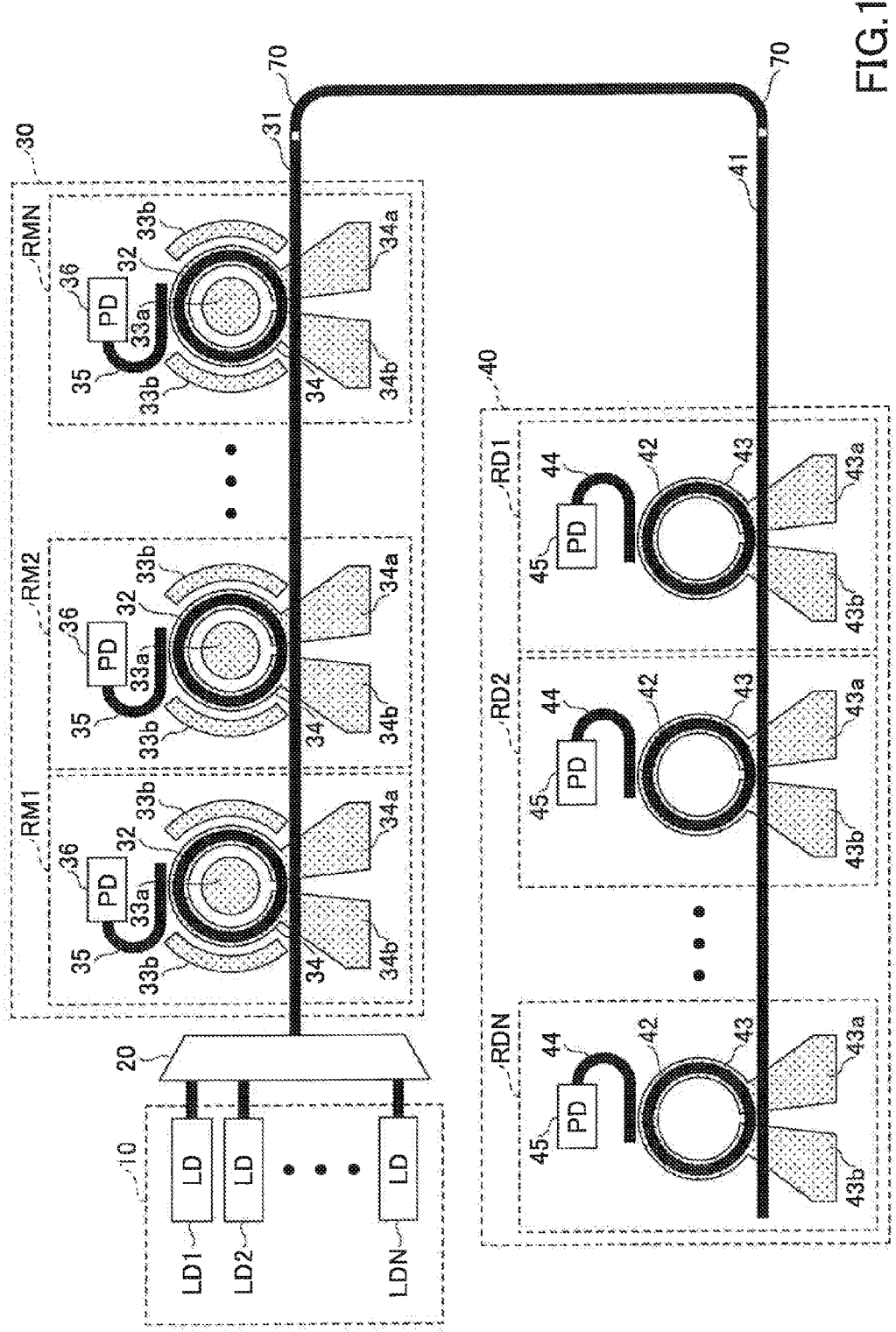
FIG. 1 is a structural diagram of optical elements.

In the following, embodiments of the present invention will be described with reference to the drawings. Note that the same members are assigned the same numerical codes, and their description may be omitted.

According to at least one embodiment of the present invention, a control method can allocate and adjust resonance wavelengths in optical elements, or multiple ring modulators and multiple ring demultiplexers, to have the wavelengths corresponding to wavelengths of light emitted from light sources.

First Embodiment

First, a wavelength division multiplexing communication apparatus including optical elements, which are controlled objects in a control method of optical elements in a first embodiment, will be described based on FIG. 1. This wavelength division multiplexing communication apparatus includes a group of light sources 10, a WDM multiplexer 20, a group of ring modulators 30, and a group of ring demultiplexers 40.

The group of light sources 10 includes multiple laser diodes as light sources that emit laser light waves (hereinafter "laser lights") having different wavelengths from each other, and the group of ring modulators 30 includes multiple ring modulators having resonant wavelengths different from each other. The group of ring demultiplexers 40 includes multiple ring demultiplexers having resonant wavelengths different from each other. Also, between the group of ring modulators 30 and the group of ring demultiplexers 40, an optical fiber 70 is provided. Instead of the optical fiber 70, a light waveguide may be formed.

The group of light sources 10 includes N laser diodes LD1, LD2, . . . , LDN having wavelengths different from each other, and the laser lights emitted from the N laser diodes LD1, LD2, . . . , LDN in the group of light sources 10 are multiplexed by the WDM multiplexer 20. The laser lights having different wavelengths multiplexed by the WDM multiplexer 20 are incident on a light waveguide 31 in the group of ring modulators 30. The group of ring modulators 30 includes N the ring modulators RM1, RM2, . . . , RMN connected in cascade along the light waveguide 31, and having resonance wavelengths different from each other. In the ring modulators RM1, RM2, . . . , RMN, the respective laser lights having the wavelengths corresponding to the ring modulators RM1, RM2, . . . , RMN are modulated, and are transmitted from the light waveguide 31 in the group of ring modulators 30 to be incident on one terminal part of the optical fiber 70. The modulated laser lights having wavelengths different from each other that are incident on the optical fiber 70 propagate through the optical fiber 70, and then, are transmitted from the other terminal part of the optical fiber 70, to be incident on a light waveguide 41 in the group of ring demultiplexers 40. The group of ring demultiplexers 40 includes N ring demultiplexers RD1, RD2, . . . , RDN connected in cascade along the light waveguide 41, and having resonance wavelengths different from each other. In the ring demultiplexers RD1, RD2, . . . , RDN, the laser lights having the wavelengths corresponding to the respective ring demultiplexers RD1, RD2, . . . , RDN are demultiplexed to detect a light signal.

The ring modulators RM1, RM2, . . . , RMN in the group of ring modulators 30 have substantially the same structure except that their resonance wavelengths are different, and include ring resonators 32, modulation electrodes 33a and 33b, heaters 34, waveguides for photo detection 35, and photodetectors 36, respectively. The ring resonator 32 is formed in a circular shape, and disposed in the neighborhood of the light waveguide 31. In the ring resonator 32, the modulation electrode 33a is provided, and on the outside, the modulation electrode 33b is provided. An optical modulation is performed by applying a voltage between the modulation electrode 33a and modulation electrode 33b.

The heater 34 functioning as a wavelength adjustment electrode is provided corresponding to the form of the ring resonator 32, at a position where the ring resonator 32 can be locally heated, which may be positioned above, below, along the inner circumference, or along the outer circumference of the ring resonator 32. The heater electrode 34a is provided at one terminal part of the heater 34, and the heater electrode 34b is provided at the other terminal part. The heater 34 can heat a part where the ring resonator 32 is formed, by making a current flow between the heater electrode 34a and heater electrode 34b. This can change the temperature of the ring resonator 32, and hence, the resonance wavelength can be adjusted. The waveguide for photo detection 35 is disposed in the neighborhood of the ring resonator 32 at a position facing the light waveguide 31, having the ring resonator 32 in-between. The facing position is just an example, and any position in the neighborhood of the ring resonator 32 may be allowable. The photodetector 36 is connected with the waveguide for photo detection 35, with which light can be monitored that propagates through the ring resonator 32 via the waveguide for photo detection 35. In the present embodiment, the photodetector 36 is formed of a light detection device.

The ring demultiplexers RD1, RD2, . . . , RDN in the group of ring demultiplexers 40 have substantially the same structure except that the resonance wavelengths are different, and include ring resonators 42, heaters 43, waveguides for photo detection 44, and photodetectors 45, respectively. The ring resonator 42 is formed in a circular shape, and disposed in the neighborhood of the light waveguide 41.

The heater 43 is provided corresponding to the form of the ring resonator 42, at a position where the ring resonator 42 is locally heated, which may be positioned above, below, along the inner circumference, or along the outer circumference of the ring resonator 42. The heater electrode 43a is provided at one terminal part of the heater 43, and the heater electrode 43b is provided at the other terminal part. The heater 43 can heat a part where the ring resonator 42 is formed, by making a current flow between the heater electrode 43a and heater electrode 43b. This can change the temperature of the ring resonator 42, and hence, the resonance wavelength can be adjusted. The waveguide for photo detection 44 is disposed in the neighborhood of the ring resonator 42 at a position facing the light waveguide 41, having the ring resonator 42 in-between. The facing position is just an example, and any position in the neighborhood of the ring resonator 42 may be allowable. The photodetector 45 is connected with the waveguide for photo detection 44, with which light can be monitored that propagates through the ring resonator 42 via the waveguide for photo detection 44. In the present embodiment, the photodetector 45 is formed of a light detection device.

In the apparatus illustrated in FIG. 1, the wavelengths of the laser lights emitted from the laser diodes LD1, LD2, . . . , LDN in the group of light sources 10 need to have one-to-one correspondences with the resonance wavelengths of the ring modulators RM1, RM2, . . . , RMN in the group of ring modulators 30, respectively. Also, the wavelengths of the laser lights emitted from the laser diodes LD1, LD2, . . . , LDN in the group of light sources 10 need to have one-to-one correspondences with the resonance wavelengths of the ring demultiplexers RD1, RD2, . . . , RDN in the group of ring demultiplexers 40, respectively.

Figure 2:
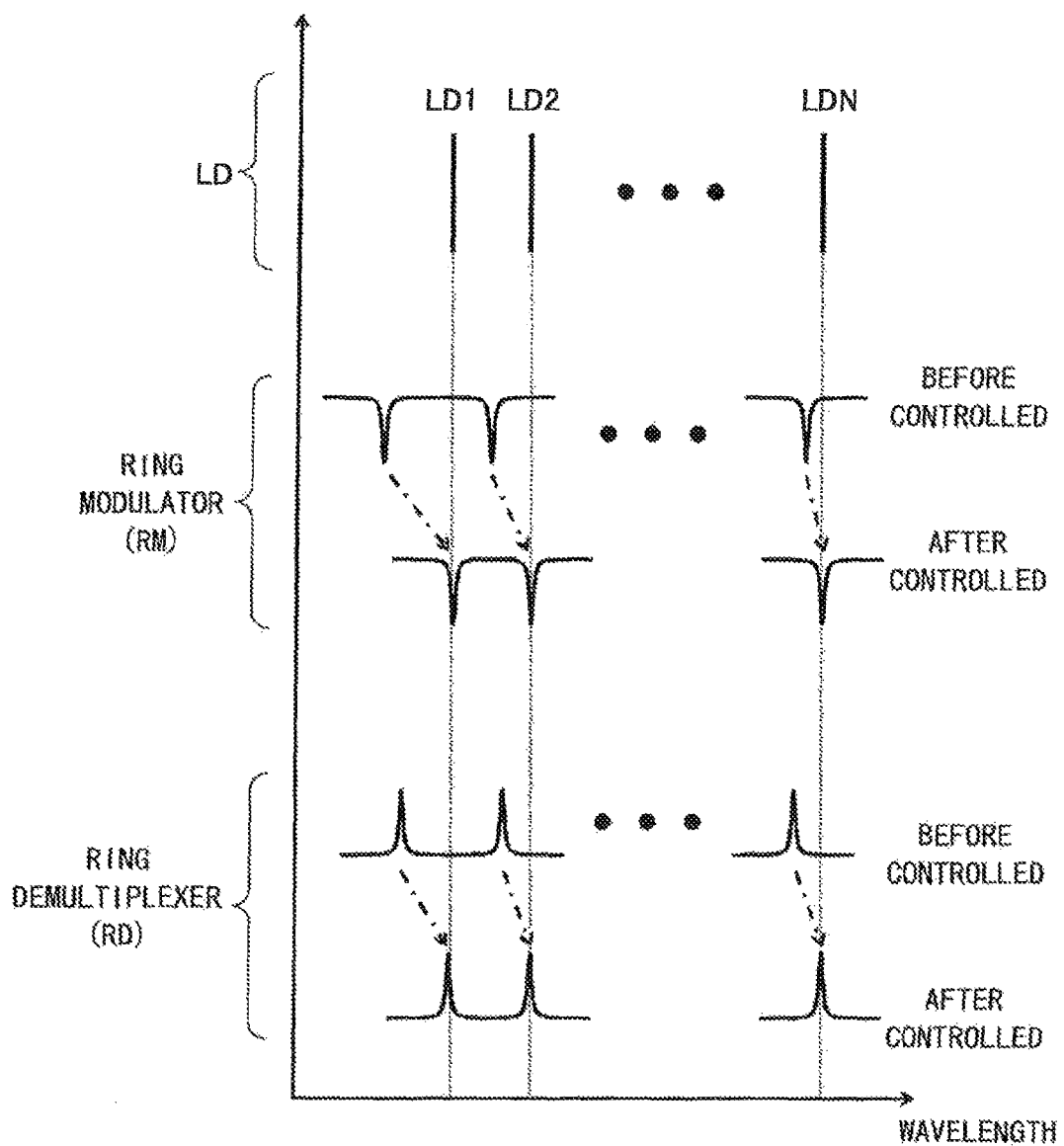
FIG. 2 is an explanatory diagram of optical elements.

Specifically, as illustrated in FIG. 2, before being controlled, the resonance wavelengths of the ring modulators RM1, RM2, . . . , RMN in the group of ring modulators 30 are shifted from the wavelengths of the laser lights emitted from the laser diodes LD1, LD2, . . . , LDN in the group of light sources 10, respectively. Namely, they are not equivalent, respectively. Therefore, the resonance wavelengths of the ring modulators RM1, RM2, . . . , RMN in the group of ring modulators 30 need to be controlled to be equivalent to the respective wavelengths of the laser lights emitted from the laser diodes LD1, LD2, . . . , LDN in the group of light sources 10.

Also, as illustrated in FIG. 2, before being controlled, the resonance wavelengths of the ring demultiplexers RD1, RD2, . . . , RDN in the group of ring demultiplexers 40 are shifted from the wavelengths of the laser lights emitted from the laser diodes LD1, LD2, . . . , LDN in the group of light sources 10, respectively. Namely, they are not equivalent, respectively. Therefore, the resonance wavelengths of the ring demultiplexers RD1, RD2, . . . , RDN in the group of ring demultiplexers 40 need to be controlled to be equivalent to the respective wavelengths of the laser lights emitted from the laser diodes LD1, LD2, . . . , LDN in the group of light sources 10.

Therefore, in the present embodiment, a relationship is detected between the wavelengths of the laser lights emitted from the laser diodes LD1, LD2, . . . , LDN in the group of light sources 10, and the resonance wavelengths of the ring modulators RM1, RM2, . . . , RMN in the group of ring modulators 30. Next, the ring modulators RM1, RM2, . . . , RMN in the group of ring modulators 30 are identified to correspond to the wavelengths of the laser lights emitted from the laser diodes LD1, LD2, . . . , LDN in the group of light sources 10, respectively. Next, the resonance wavelengths of the ring modulators RM1, RM2, . . . , RMN in the group of ring modulators 30 are adjusted to be equivalent to the wavelengths of the laser lights emitted from the laser diodes LD1, LD2, . . . , LDN in the group of light sources 10, respectively. Thus, the resonance wavelengths of the ring modulators RM1, RM2, . . . , RMN in the group of ring modulators 30 can be made equivalent to the wavelengths of the laser lights emitted from the laser diodes LD1, LD2, . . . , LDN in the group of light sources 10, respectively.

Similarly, in the present embodiment, a relationship is detected between the wavelengths of the laser lights emitted from the laser diodes LD1, LD2, . . . , LDN in the group of light sources 10, and the resonance wavelengths of the ring demultiplexers RD1, RD2, . . . , RDN in the group of ring demultiplexers 40, respectively. Next, the ring demultiplexers RD1, RD2, . . . , RDN in the group of ring demultiplexers 40 are identified to correspond to the wavelengths of the laser lights emitted from the laser diodes LD1, LD2, . . . , LDN in the group of light sources 10, respectively. Next, the resonance wavelengths of the ring demultiplexers RD1, RD2, . . . , RDN in the group of ring demultiplexers 40 are adjusted to be equivalent to the wavelengths of the laser lights emitted from the laser diodes LD1, LD2, . . . , LDN in the group of light sources 10, respectively. Thus, the wavelengths of the laser lights emitted from the laser diodes LD1, LD2, . . . , LDN in the group of light sources 10, and the resonance wavelengths of the ring demultiplexers RD1, RD2, . . . , RDN in the group of ring demultiplexers 40 can be made equivalent to each other, respectively.

Figure 3:
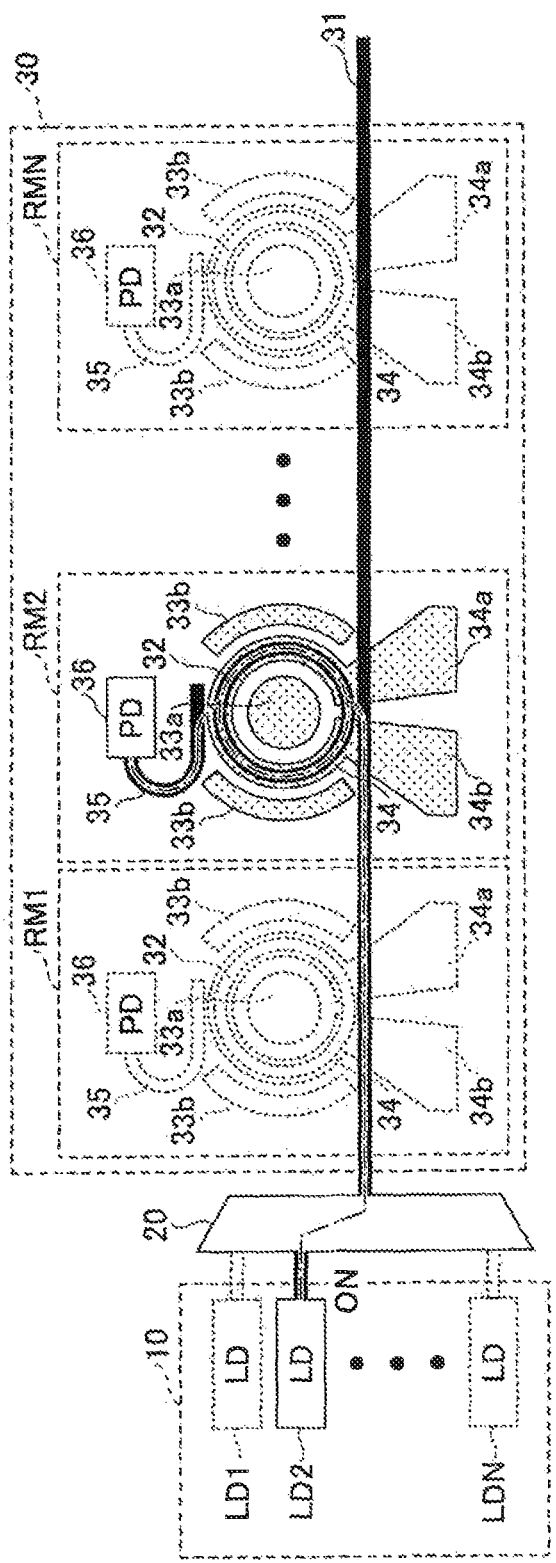
FIG. 3 is an explanatory diagram (1) of a control method of optical elements according to a first embodiment of the present invention.

Next, as illustrated in FIG. 3, a case will be described where the resonance wavelength of the ring modulator RM2 in the group of ring modulators 30 is made equivalent to the wavelength of the laser light emitted from the laser diode LD2 in the group of light sources 10, based on FIG. 4.

Figure 4:
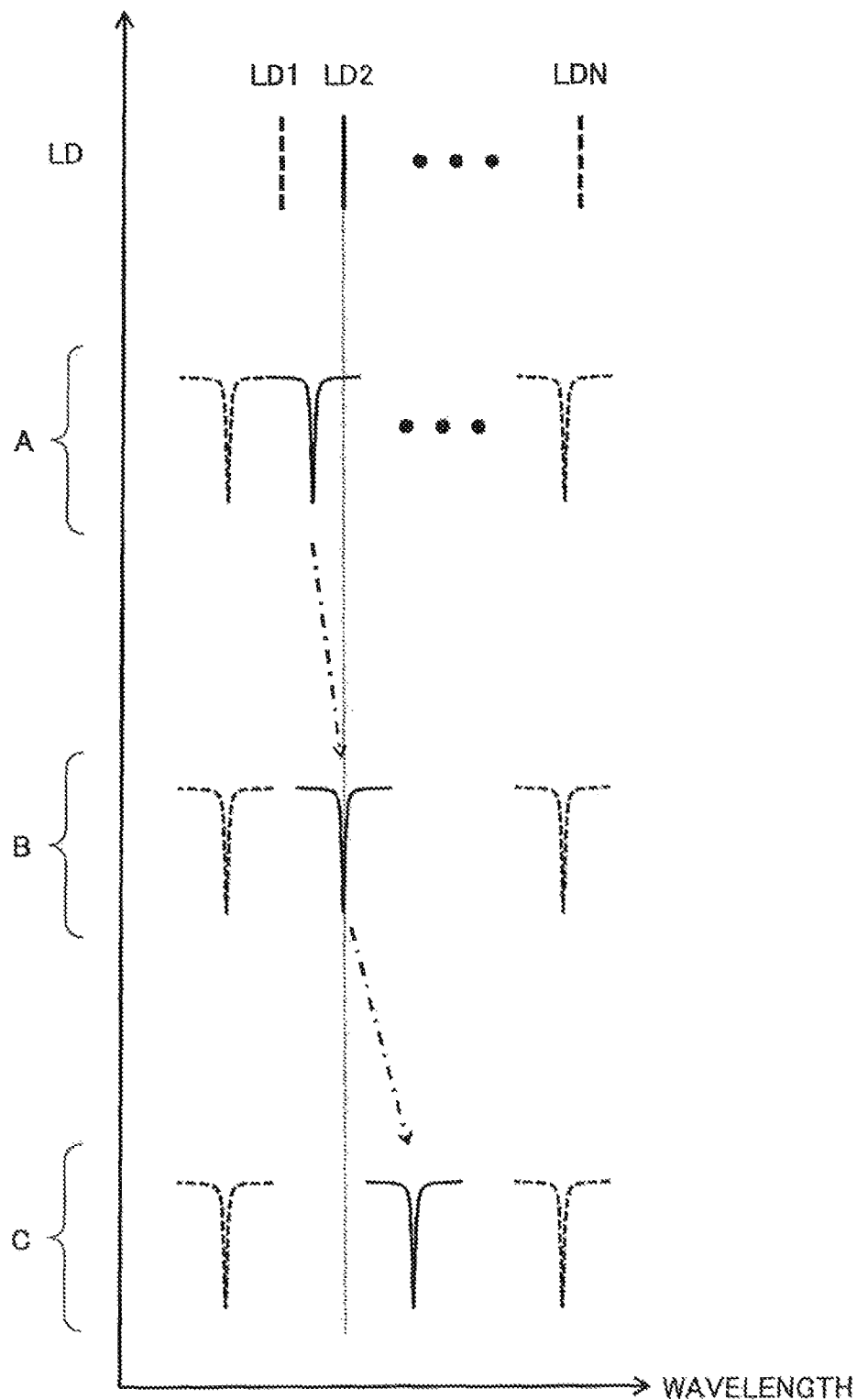
FIG. 4 is an explanatory diagram (2) of a control method of optical elements according to the first embodiment.

FIG. 4 illustrates changes of the resonance wavelength in the ring modulator RM2 when the current flowing between the heater electrode 34a and the heater electrode 34b of the heater 34 is changed while having the laser diode LD2 emit light. In FIG. 4, parts A, B, and C illustrate changes of the resonance wavelengths when the current flowing between the heater electrode 34a and the heater electrode 34b of the heater 34 is increased in this order. Note that, by increasing the current flowing between the heater electrode 34a and the heater electrode 34b, the electric power ($P_{heater}$) supplied to the heater 34 increases. By increasing the current flowing between the heater electrode 34a and the heater electrode 34b, namely, by increasing the electric power ($P_{heater}$) supplied to the heater 34, the resonance wavelength is shifted toward the longer wavelength side. Note that, in the present embodiment, increasing the electric power supplied to the heater 34 from zero may be referred to as "sweeping".

Figure 5:
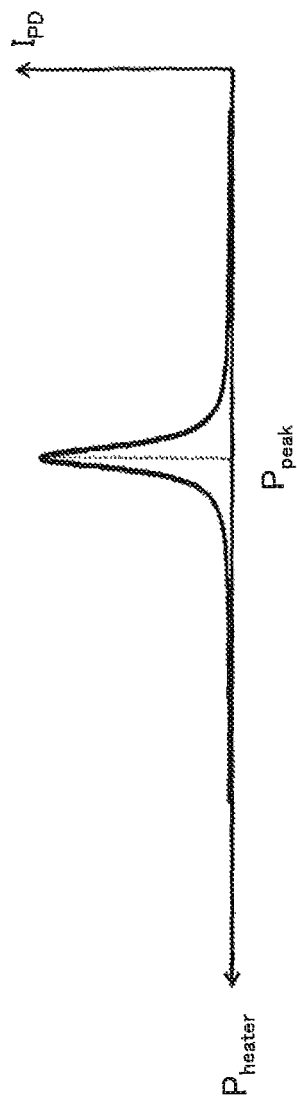
FIG. 5 is an explanatory diagram (3) of a control method of optical elements according to the first embodiment.

As illustrated in FIG. 5, adjustment of the resonance wavelength in the ring modulator RM2 is performed by adjusting the electric power supplied to the heater 34 so that a value of the light strength $I_{PD}$ detected by the photodetector 36 in the ring modulator RM2 takes a peak. In this way, by adjusting the electric power supplied to the heater 34 so that the value of the light strength $I_{PD}$ detected by the photodetector 36 of the ring modulator RM2 takes a peak, as illustrated in part B of FIG. 4, the resonance wavelength of the ring modulator RM2 can be made equivalent to the wavelength of the laser light emitted from the laser diode LD2. In the case illustrated in FIG. 5, the value of the light strength $I_{PD}$ detected by the photodetector 36 takes a peak with the amount of electric power $P_{peak}$. Having obtained values in this way, the value of the amount of electric power $P_{peak}$ supplied to the heater 34 of the ring modulator RM2 while having the laser diode LD2 emit light is stored in a storage unit (not illustrated).

Similarly, while having the laser diode LD2 emit light, the electric power is changed that is supplied to the heater 34 ($P_{heater}$) of each of the other ring modulators RM1, . . . , RMN. Thus, the values of the amounts of electric power $P_{peak}$ detected by the photodetectors 36 are obtained to be stored in the storage unit (not illustrated), respectively.

The same process as above is performed for each of the other laser diodes LD1, . . . , LDN in the group of light sources 10. Thus, as illustrated in FIG. 6, a table of values of the amounts of electric power $P_{peak}$ is obtained where the values correspond to combinations between the laser diodes LD1, LD2, ..., LDN in the group of light sources 10, and the ring modulators RM1, RM2, ..., RMN in the group of ring modulators 30. In the present embodiment, the two-dimensional array obtained in this way as illustrated in FIG. 6 may be referred to as a "PPM (Peak-Position Matrix)". Such a PPM is stored in the storage unit (not illustrated). Note that FIG. 6 illustrates an example of a PPM for a case where the number of laser diodes in the group of light sources 10 is eight, and the number of ring modulators in the group of ring modulators 30 is eight, namely, N is eight.

The PPM illustrated in FIG. 6 is a two-dimensional array having indices of the laser diodes LD1, LD2, ..., LD8 in the group of light sources 10, and the ring modulators RM1, RM2, RM8 in the group of ring modulators 30. The PPM stores detected values of the amounts of electric power $P_{peak}$ as array elements which are referred to by the indices of the laser diodes and the ring modulators with which the values of the amounts of electric power $P_{peak}$ are detected. For example, the PPM illustrated in FIG. 6 is a matrix that has rows for the laser diodes LD1, LD2, ..., LD8 in the group of light sources 10, and columns for the ring modulators RM1, RM2, ..., RM8 in the group of ring modulators 30. In the PPM, an element at (m, n) stores a detected value of the amount of electric power $P_{peak}$ where m represents one of the digits at the tails of the laser diodes LD1, LD2, ..., LD8, and n represents one of the digits at the tails of the ring modulators RM1, RM2, ..., RM8. An upper limit is set for the values of the amounts of electric power $P_{peak}$ from the viewpoint of the drive capability of the drive circuit and/or the reliability of the heater 34. In a range less than or equal to the upper limit, if a peak of the light strength $I_{PD}$ is not detected by one of the photodetectors 36 of the ring modulators RM1, RM2, ..., RM8, the corresponding element in the PPM stores a non-detection tag (for example, a blank) indicating that no peak is detected.

Incidentally, in the present embodiment, it is assumed that while m representing one of the digits at the tails of the laser diodes LD1, LD2, ..., LD8 increases, the wavelength of the laser light emitted from the corresponding laser diode becomes longer. Also, it is assumed that while n representing one of the digits at the tails of the ring modulators RM1, RM2, ..., RM8 increases, the ring diameter of the corresponding ring resonator 32 becomes greater. Therefore, in this case, as illustrated in the PPM in FIG. 6, elements other than non-detection tags have smaller values rightward in the same row, and greater values downward in the same column. Note that, as illustrated in FIG. 1, multiple ring resonance wavelengths exist periodically. The resonance wavelength of a ring resonator 32 on the long wavelength side of the resonance wavelength of the ring resonator 32 of the ring modulator RM8 is derived from the ring resonator 32 of the ring modulator RM1. Therefore, "downward" and "rightward" in the above have a cyclical meaning, namely, the ring modulator RM1 is positioned at the right of the ring modulator RM8, and the laser diode LD1 is positioned below the laser diode LD8.

In the present embodiment, as illustrated in FIG. 6, N (eight) diagonal sequences obliquely arranged to the lower right include diagonal sequences having no non-detection tags (diagonal sequences without blanks). If there are multiple diagonal sequences without blanks, they are adjacent in the vertical direction. Among these, one of the diagonal sequences without blanks is selected to correspond with the laser diodes LD1, LD2, ..., LD8 with the ring modulators RM1, RM2, ..., RM8, which are used as indices of the elements. Thus, the ring modulators and the laser diodes correspond one-to-one. By selecting an uppermost one among the adjacent diagonal sequences without blanks, the total amount of power can be minimized, and the power consumption can be minimized.

Figure 7:
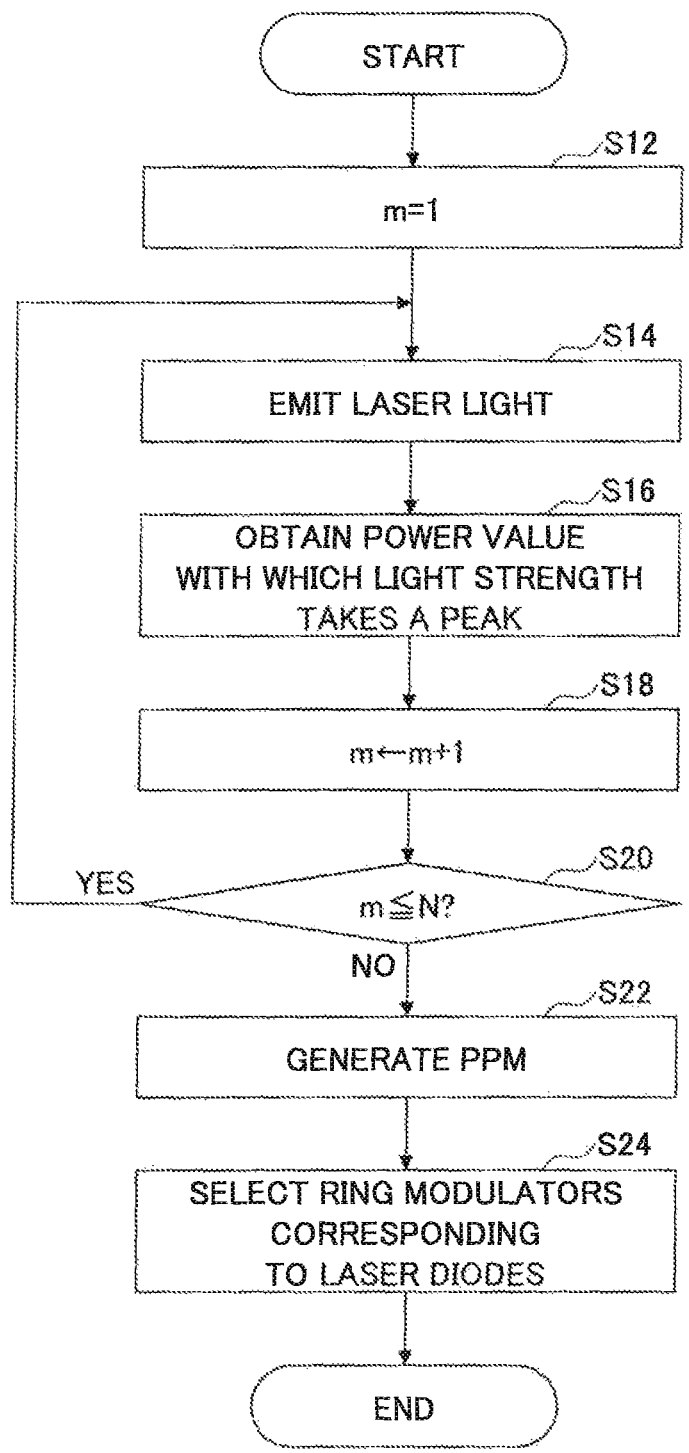
FIG. 7 is a flowchart of a control method of optical elements according to the first embodiment.

A simple example of the control method of optical elements in the present embodiment will be described based on FIG. 7. The control method of optical elements in the present embodiment first sets m to 1 at Step S12.

Next, at Step S14, the laser diode LDm in the group of light sources 10 emits laser light.

Next, at Step S16, the values of the amounts of electric power $P_{peak}$ are obtained which are peaks of the light strength $I_{PD}$ detected by the photodetectors 36 of the ring resonators 32 of the ring modulators RM1, RM2, ..., RMN. Note that this Step may be executed as a loop for the ring modulators RMn where n takes 1 to N.

Next, at Step S18, the present m is incremented with 1.

Next, at Step S20, it is determined whether m is less than or equal to N. If m is less than or equal to N, the process goes to Step S14. If m is not less than or equal to N, the process goes to Step S22.

Next, at Step S22, a PPM is generated based on obtained values of the amounts of electric power $P_{peak}$.

Next, at Step S24, by selecting an uppermost diagonal sequence among the diagonal sequences without blanks in the PPM, the ring modulators RM1, RM2, RM8 are selected that correspond to the laser diodes LD1, LD2, ..., LDN one-to-one.

Figure 8:
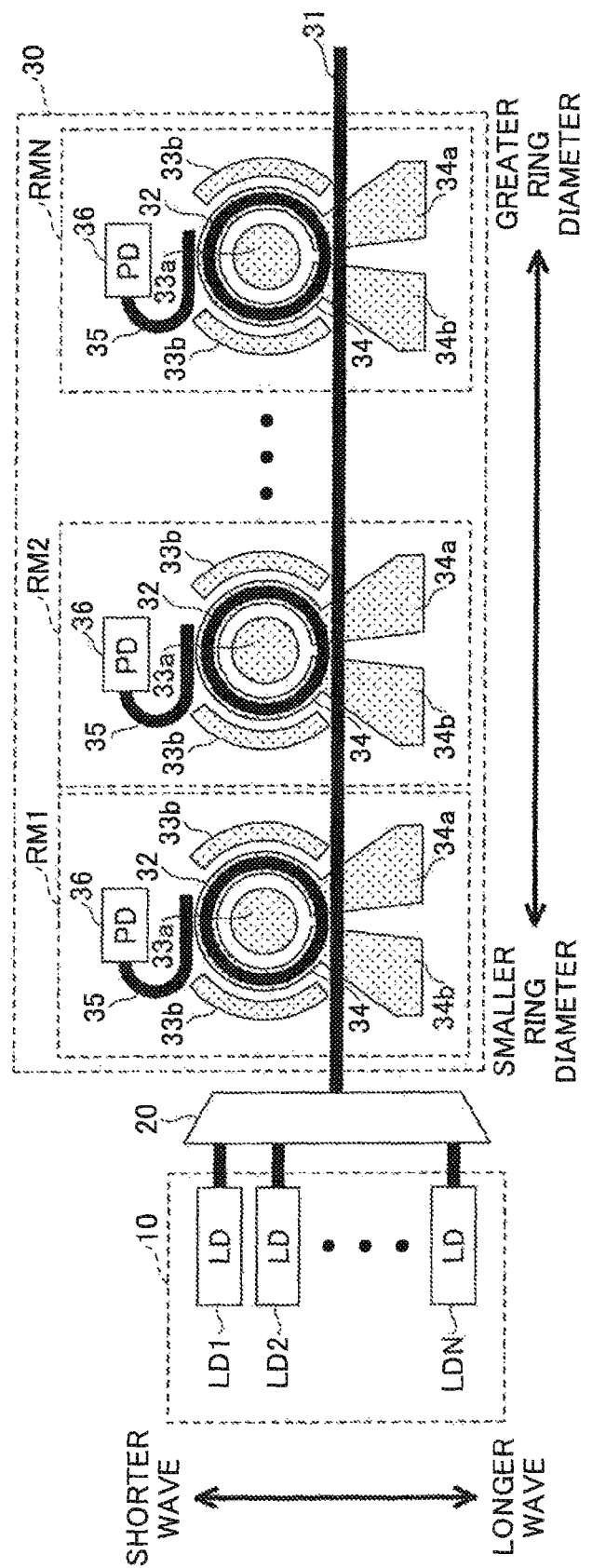
FIG. 8 is an explanatory diagram (5) of a control method of optical elements according to the first embodiment.

Note that, in the present embodiment, a case is described where the ring modulators RM1, RM2, ..., RMN in the group of ring modulators 30 are those illustrated in FIG. 8. Namely, the description is based on a WDM transmitter that includes N laser diodes and N ring modulators having different wavelengths, respectively, and laser lights emitted from all laser diodes are multiplexed, which are then guided to a waveguide where the ring modulators are connected in cascade. Specifically, while the digit at the tails of the laser diodes LD1, LD2, ..., LDN is greater, the corresponding wavelength gets longer. Also, it is structured that while the digit at the tails of the ring modulators RM1, RM2, ..., RMN is greater, the corresponding ring modulator is placed more downstream relative to the group of light sources 10, and has a greater ring diameter. In a PPM for ring modulators having such a structure, as illustrated in FIG. 6, the numerical value of a matrix element is smaller when going rightward or upward; right-downward diagonal sequences without blanks are generated; and these diagonal sequences are adjacent to each other vertically. By selecting that positioned uppermost among these diagonal sequences, laser diodes can be determined so that their wavelengths are allocated to the respective ring modulators.

In the present embodiment, although a case for ring modulators is described, the description is substantially the same if the ring modulators are replaced by ring demultiplexers, and the same control can be applied. In this case, it is possible to have the photodetectors 45 of the ring demultiplexers RD1, RD2, ..., RDN in the group of ring demultiplexers 40, function as monitors. For example, in this case, by applying low-pass filtering to an electric signal output from a photodetector 45, the average power of a light signal after demultiplexing can be monitored, and resonance wavelengths of a laser diode and a ring demultiplexer can be made equivalent to each other.

Optical elements in the present embodiment are formed by processing an SOI (Silicon on Insulator) substrate. Specifically, the ring resonators 32 in the ring modulators RM1, RM2, ..., RMN, and the ring demultiplexers RD1, RD2, ..., RDN in the group of ring demultiplexers 40 are formed by processing the SOI substrate. In this case, although it is possible to form a core of an Si layer of the SOI substrate, and to form an Si light waveguide having a cladding of an SiO2 layer, it is not so limited, but the core may be formed of a compound semiconductor or the like, and the waveguide may be a quartz waveguide.

Also, in FIG. 8 and the like, although the ring modulators RM1, RM2, ..., RMN are arranged so that the ring diameters of the ring resonators 32 become greater when going more downstream relative to the group of light sources 10, they may be conversely arranged so that the ring diameters become smaller. In this case, although a PPM similar to that illustrated in FIG. 6 is obtained, optimal pairs of a laser diode and a ring modulator can be selected by selecting the uppermost right-upward diagonal sequence without blanks.

Also, in the present embodiment, it is assumed that while m representing digits at the tails of the laser diodes LD1, LD2, ..., LD8 increases, the wavelength of the laser light emitted from the corresponding laser diode becomes longer. Conversely, the wavelength of the emitted laser light may become shorter. In this case, although the direction of a diagonal sequence may be changed from right-downward to right-upward, it can be dealt with by appropriately assuming the direction of the diagonal sequence without blanks. Also, a diagonal sequence without blanks can be selected one of the uppermost one and the lowermost one, depending on the definition of digits at the tails of numerical codes of laser diodes and ring modulators, which can be appropriately determined.

Also, the PPM may not be a matrix, but may be any data structure that can be indexed by digits m at the tails of laser diodes and digits n at the tails of ring modulators.

Second Embodiment

Figure 9:
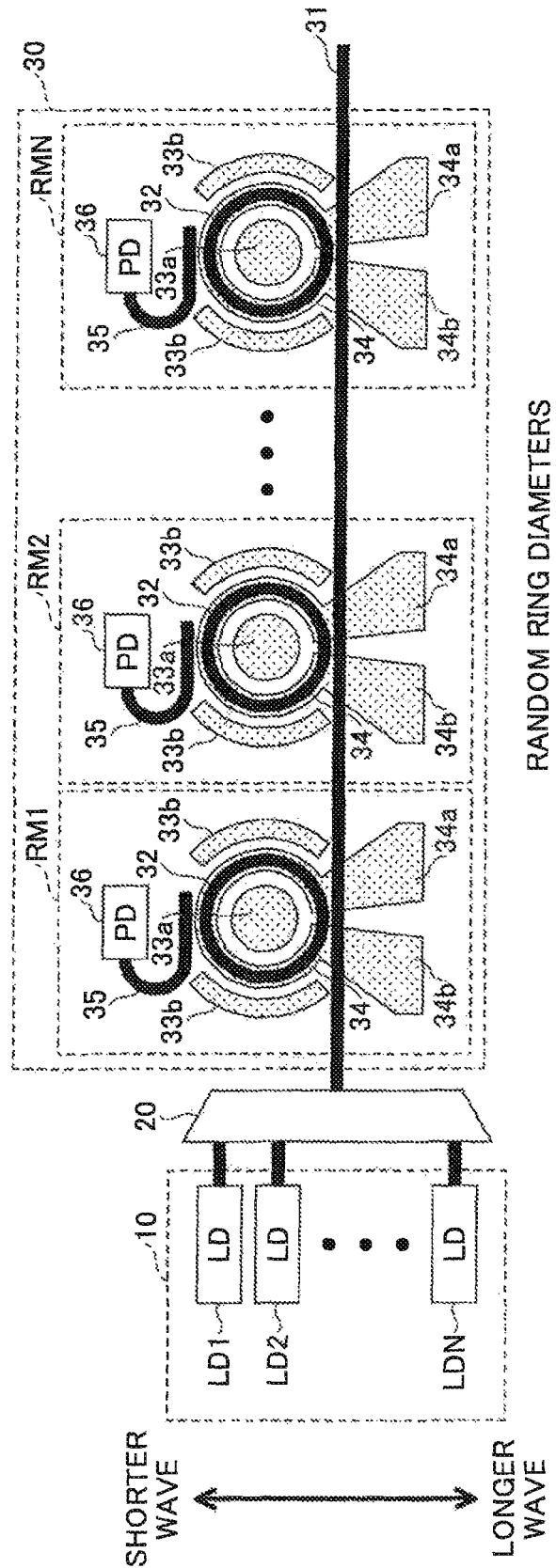
FIG. 9 is an explanatory diagram (1) of a control method of optical elements according to a second embodiment of the present invention.

Next, a second embodiment will be described. The present embodiment is a control method for optical elements having a structure in which the ring diameters of the ring resonators 32 of the ring modulators RM1, RM2, ..., RM8 in the group of ring modulators 30 do not become greater or smaller in order when going downstream from the group of light sources 10. Namely, as illustrated in FIG. 9, it is a control method for the ring modulators RM1, RM2, ..., RM8 in the group of ring modulators 30 in which the ring resonators 32 having different ring diameters are randomly placed. In this case, as illustrated in FIG. 10, the generated PPM has rows of elements which are not necessarily monotonically decreasing while going rightward, and blanks are irregularly positioned. Therefore, a diagonal sequence without blanks does not necessarily exist. In such a case, columns are exchanged to be differently ordered so that elements in the same row are monotonically decreasing while going rightward, to obtain a PPM having the order of columns is changed as illustrated in FIG. 11. After that, by applying the same process as in the first embodiment, laser diodes can be selected that are allocated to the respective ring modulators. In this way, it is possible to deal with a case where the ring modulators RM1, RM2, ..., RM8 in the group of ring modulators 30 have a great variation of the resonance wavelengths of the ring resonators 32, which makes it difficult to regularly place the ring modulators corresponding to the wavelengths of the laser lights. Therefore, processing precision of ring modulators can be relaxed, and optical elements can be manufactured at a lower cost. Note that, in the present embodiment, although a case for ring modulators is described, the present embodiment is not limited to the ring modulators. Namely, it can be applied to the ring demultiplexer RD1, RD2, ..., RD8 in the group of ring demultiplexers 40 as illustrated in FIG. 1 even if the ring resonators 42 having different ring diameters are randomly placed.

Third Embodiment

Next, a third embodiment will be described. In the first embodiment and the second embodiment described above, the laser diodes can have the corresponding ring modulators allocated, and the resonance wavelengths of the ring resonators of the ring modulators can be adjusted. However, the resonance wavelength of a ring resonator and the wavelength of a laser light emitted from a laser diode change depending on an environmental temperature, and always need fine adjustments. The present embodiment deals with such temperature change.

Figure 12:
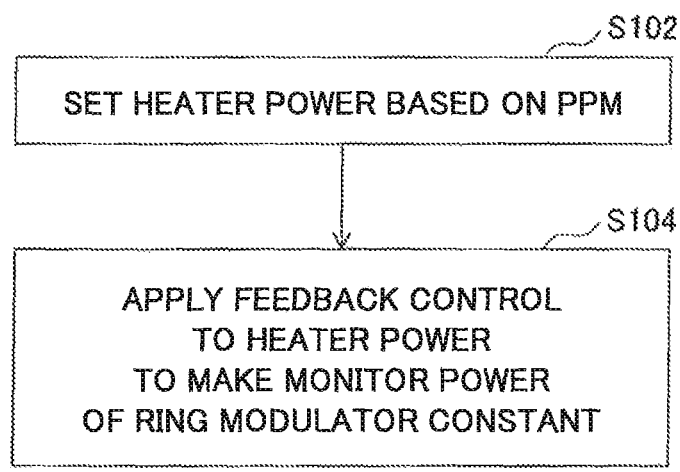
FIG. 12 is an explanatory diagram of a control method of optical elements according to a third embodiment of the present invention.

Specifically, as illustrated in FIG. 12, first, initial wavelength adjustment is performed by setting the electric power supplied to the heater 34 in a ring modulator based on the PPM at Step S102.

After that, at Step S104, feedback control is performed so that the light strength detected at the photodetector 36 of the ring modulator takes a certain value, to maintain a wavelength relationship with a laser diode to be suitable for modulation.

At this moment, the feedback control to be performed is not limited to a method that controls the light strength detected at the photodetector 36 of the ring modulator to take a certain value. For example, it may be a method that detects the optical modulation amplitude of a signal waveform after modulation by monitoring the optical modulation amplitude at a monitor port, or a method that controls the power of the monitor port to take a maximal value. The present embodiment is described for a case of ring modulators, but it not limited to the ring modulators. Namely, it can be applied to ring demultiplexers illustrated in FIG. 1. In a case of ring demultiplexers, this feedback control can be performed by performing peaking control causing the monitor power detected by the photodetector 45 of a ring demultiplexer to take a maximal value.

Fourth Embodiment

Next, a fourth embodiment will be described. The present embodiment is a method that selects a diagonal sequence without blanks after obtaining elements of the PPM, and then, deleting elements having a certain value or less to make them blanks. For example, when using a heater 34 in a ring modulator as a wavelength adjustment mechanism, the temperature can be raised by increasing the electric power applied to the heater 34, to shift the resonance wavelength in the ring resonator 32 to a longer wavelength for the adjustment. However, since the temperature cannot be lowered by the heater 34, the resonance wavelength in the ring resonator 32 cannot be adjusted to be shifted to the shorter wavelength side.

Figure 13:
FIG. 13 is an explanatory diagram of a control method of optical elements according to a fourth embodiment of the present invention.

Also, an environmental temperature change may necessitate adjusting the resonance wavelength in the ring resonator 32 to be shifted to the shorter wavelength side. In the present embodiment, in a first generated PPM illustrated in the upper part of FIG. 13, elements having a certain value, for example, five or less, are deleted, at which non-detection tags such as blanks are stored, to generate a PPM illustrated in the lower part of FIG. 13. In the present embodiment, the certain value may also be referred to as $P_{heater,th}$.

Thus, power consumption of the heater 34 can have room for reduction by the certain value, with which the resonance wavelength can be adjusted to be shifted to the shorter wavelength side more than just using the first generated PPM. The present embodiment is not limited to a case where the resonance wavelength is controlled by the heater 34, but may be applied to a case where the resonance wavelength is adjusted by performing carrier injection. In this case, conversely to the case of the heater 34, the resonance wavelength can be adjusted to be shifted only to the shorter wavelength side. Therefore, room for adjusting to be shifted to the longer wavelength side is provided.

The present embodiment is described for a case of ring modulators, but it not limited to the ring modulators; it can be applied to ring demultiplexers illustrated in FIG. 1.

Fifth Embodiment

Next, a fifth embodiment will be described. Incidentally, when obtaining elements of a PPM, a laser diode may have its wavelength changed depending on whether it is the only laser diode under operation, or multiple laser diodes operate at the same time as in actual operation. Namely, when a laser diode operates, the laser diode heats up itself, and warms up the other laser diodes disposed in the neighborhood, which generates thermal crosstalk. Therefore, fluctuation of the wavelength needs to be corrected by taking the thermal crosstalk into account.

Figure 14:
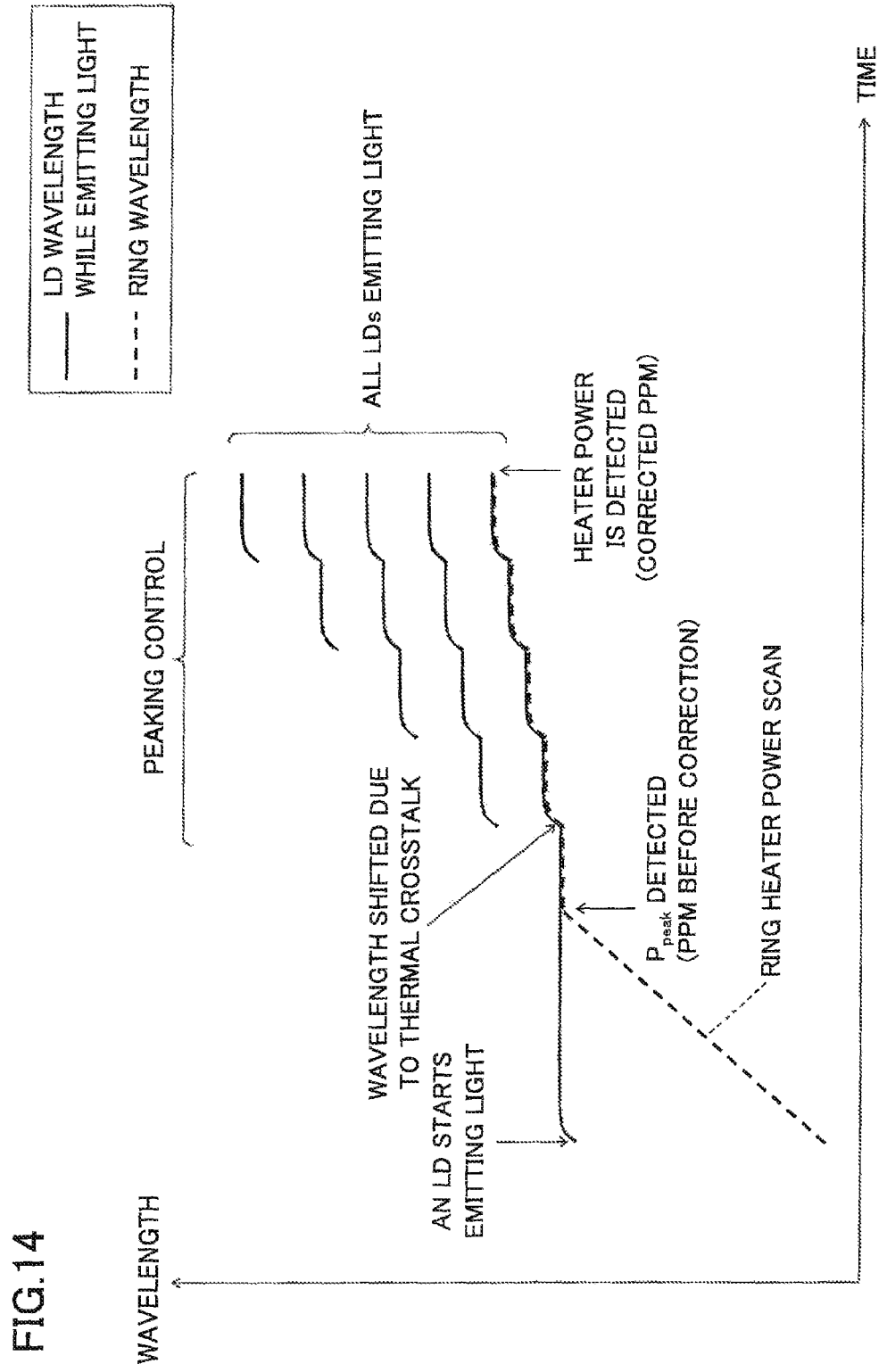
FIG. 14 is an explanatory diagram of a control method of optical elements according to a fifth embodiment of the present invention.

The present embodiment will be described based on FIG. 14. Note that FIG. 14 illustrates a case of five laser diodes as an example. As illustrated in FIG. 14, first, only one laser diode emits light, and the temperature is gradually raised by the heater 34. When a peak of the light strength is detected by the photodetector 36, the value of the amount of electric power $P_{peak}$ is stored as an element of a PPM. After that, in the ring modulator, the other laser diodes start emitting light one by one, and the power is gradually raised while feedback control is being performed to make the light strength detected by the photodetector 36 always take a maximal (peaking control). During this process, due to the thermal crosstalk, the wavelength of the laser light emitted from the laser diode is shifted, which is followed by the resonance wavelength of the ring resonator of the ring modulator by the peaking control.

After the power of the laser diode is raised to the same level as that of normal operation, the power of a next laser diode is gradually raised, and this is repeated until all laser diodes are in operational states. After that, values of the amounts of electric power $P_{peak}$, which are peaks of the light strengths eventually detected by the photodetectors 36, are stored as elements in the PPM. Thus, for a case where all laser diodes are in the operational states, the values of the amounts of electric power $P_{peak}$ can be obtained, which are the peaks of the light strengths eventually detected by the photodetectors 36. Therefore, the control can be performed even when thermal crosstalk exists among the laser diodes.

Note that it is not necessary to raise the power of the laser diodes one by one, but the power of multiple laser diodes may be raised simultaneously as long as the peaking control can catch up the speed of wavelength fluctuation. Also, as long as the peaking control can catch up the speed of wavelength fluctuation, it is not necessary to raise the power gradually and continuously, but the power may be raised discontinuously at a time.

The present embodiment is described for a case of ring modulators, but it not limited to the ring modulators; it can be applied to ring demultiplexers illustrated in FIG. 1.

Sixth Embodiment

Figure 15:
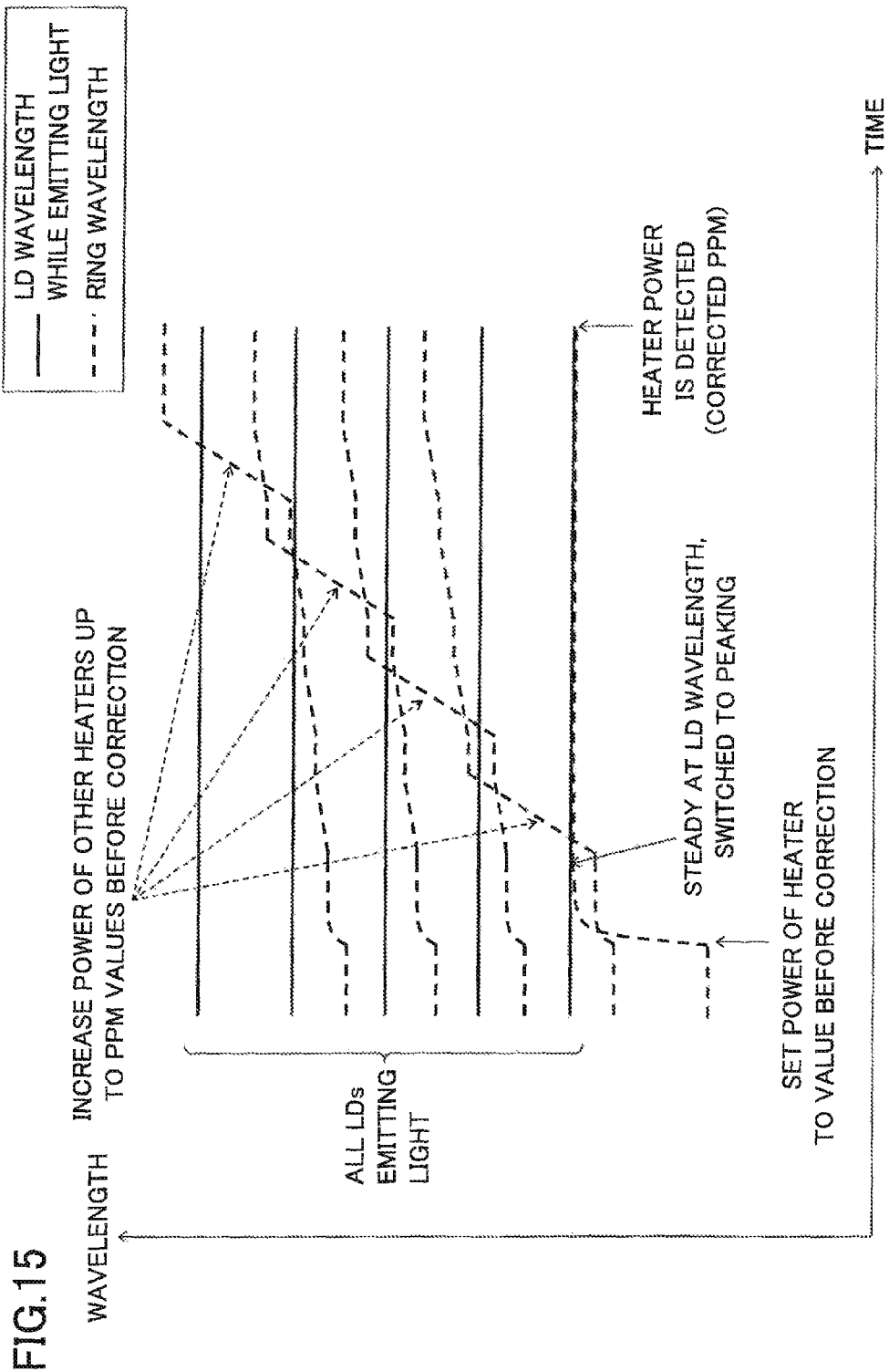
FIG. 15 is an explanatory diagram of a control method of optical elements according to a sixth embodiment of the present invention.

Next, a sixth embodiment will be described. Incidentally, similarly to a laser diode, a ring modulator may have its wavelength changed depending on whether it is the only one under operation, or multiple ring modulators operate at the same time as in actual operation. For example, when the resonance wavelength in the ring resonator 32 of a ring modulator is adjusted by the heater 34, due to heat transfer of the heaters 34 of the other ring modulators, thermal crosstalk may be generated, which causes fluctuation in the resonance wavelength. The present embodiment corrects the fluctuation of a resonance wavelength caused by such thermal crosstalk. Specifically, as illustrated in FIG. 15, after having all laser diodes emit light, taking the thermal crosstalk among the laser diodes into account, based on a corrected PPM, the amount of power $P_{peak}$ is applied to a ring modulator, with which the light strength $I_{PD}$ detected by the photodetector 36 takes a peak. Thus, this makes the wavelength of the laser light emitted from the laser diode be equivalent to the resonance wavelength of the ring resonator of the corresponding ring modulator.

After that, the amount of power $P_{peak}$ is applied to each of the other ring modulators, with which the light strength $I_{PD}$ detected by the photodetector 36 takes a peak while the peaking control is being applied to the ring modulator. During this process, the amount of power $P_{peak}$ is increased for each of the other ring modulators at a speed with which the peaking control can catch up. For example, in the case illustrated in FIG. 15, a process to gradually increase the amount of power $P_{peak}$ in one ring resonator is performed for all ring resonators in order. When the values of the amounts of electric power $P_{peak}$ reach values in the PPM for all ring resonators, the values of the amounts of electric power $P_{peak}$ adjusted by the peaking control are stored as correction values of the PPM. This process is applied to each of the ring modulators. This process may be applied to each of the ring modulators once, or may be repeated multiple times to improve precision. The present embodiment makes it possible to control optical elements even if thermal crosstalk is generated among ring resonators of ring modulators.

The present embodiment is described for a case of ring modulators, but it not limited to the ring modulators; it can be applied to ring demultiplexers illustrated in FIG. 1.

Seventh Embodiment

Next, a seventh embodiment will be described. The present embodiment applies feedback control (avoidance control) to ring modulators other than a ring modulator, with which the PPM is to be generated (for example, ring N-1 illustrated in FIG. 16), to shift the monitor power in a decreasing direction.

Figure 16:
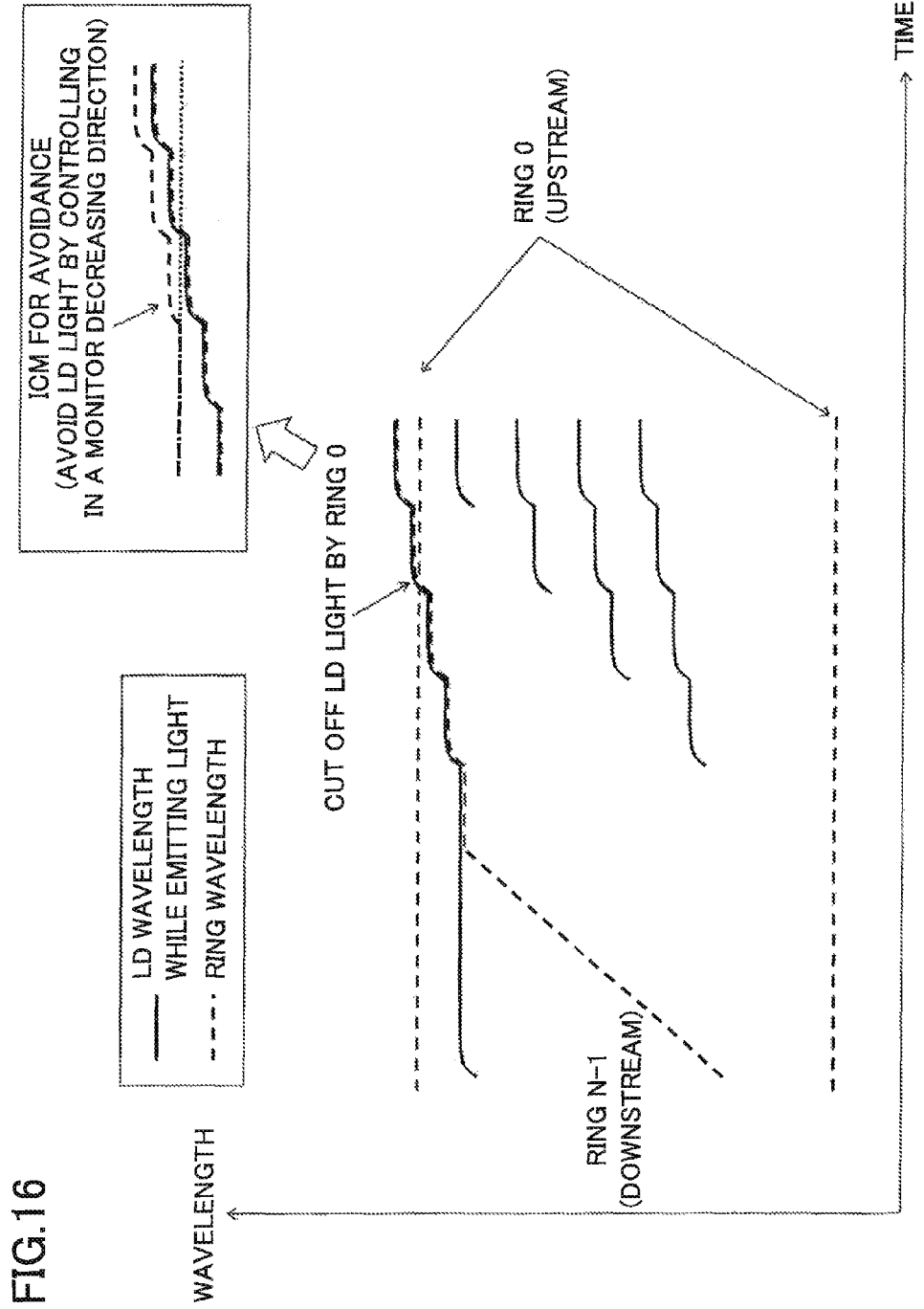
FIG. 16 is an explanatory diagram of a control method of optical elements according to a seventh embodiment of the present invention.

FIG. 16 illustrates a case where peaking control is performed to follow a long wavelength shift due to thermal crosstalk of laser diodes when detecting the value of the amount of electric power $P_{peak}$ with which the light strength $I_{PD}$ in the ring N-1 takes a peak. The peaking control needs to be performed corresponding to a long wavelength shift of the wavelength of the laser light emitted from the laser diode, to have the resonance wavelength of the ring N-1 follow the shift. Nevertheless, there are cases where the wavelength of the laser light becomes equivalent to that of a ring modulator (for example, a ring 0 illustrated in FIG. 16) positioned more upstream than the ring N-1. In such a case, the ring 0 cuts off the laser light, which hinders the peaking control. By performing avoidance control, even if the wavelength of the laser light is equivalent to that of the ring 0, the ring 0 can be controlled to avoid this wavelength, and the cut-off of the laser light can be suppressed.

By applying such avoidance control to ring modulators other than that for generating a PPM, the cut-off of the laser light caused by an upstream ring modulator can be avoided, all variations of the resonance wavelength in the ring resonator can be dealt with, and normal control operation can be performed. The cut-off of a laser light influences the peaking operation when the transmittance of the laser light changes by a certain ratio or greater, and does not have an influence with a slight change. Therefore, the avoidance control does not necessarily need to be performed at all times, but may be performed once the monitor power becomes a certain value or greater. Thus, the control electric power can be reduced.

The present embodiment is described for a case of ring modulators, but it not limited to the ring modulators; it can be applied to ring demultiplexers illustrated in FIG. 1.

Furthermore, as illustrated in FIG. 1, in a case where ring modulators and ring demultiplexers are used together, when detecting PPM elements of a ring demultiplexer, not only an upstream ring demultiplexer, but also a ring modulator needs to be considered as a ring resonator positioned upstream. In this case, by performing the avoidance control for all ring demultiplexers and ring modulators other than a ring demultiplexer for PPM element detection, the cut-off of the laser light caused by an upstream ring resonator can be avoided.

Eighth Embodiment

Figure 17:
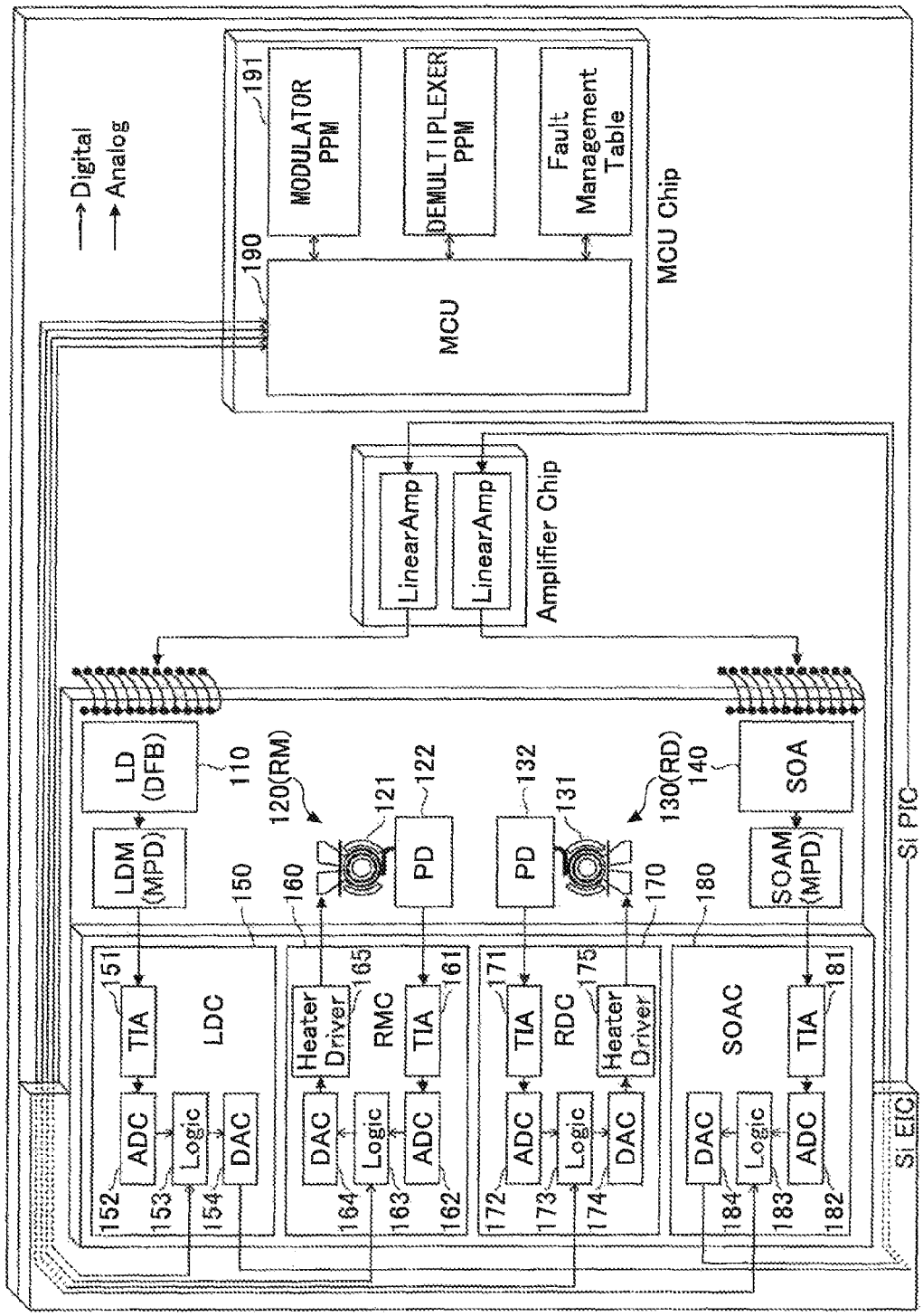
FIG. 17 is a structural diagram of optical elements according to an eighth embodiment of the present invention.

Next, an eighth embodiment will be described. The present embodiment is a control system in a WDM link that uses a ring modulator and a ring demultiplexer as illustrated in FIG. 17.

The present embodiment includes a laser diode (LD) 110, a ring modulator (RM) 120, a ring demultiplexer (RD) 130, and a semiconductor optical amplifier (SOA) 140. Ring resonators 121 and 131 in the ring modulator (RM) 120 and the ring demultiplexer (RD) 130 are formed of silicon light integrated circuits (Si PIC, or Si Photonic Integrated Circuits), in a small high-density package.

Also, the present embodiment includes a laser diode controller (LDC) 150, a ring modulator controller (RMC) 160, a ring demultiplexer controller (RDC) 170, and an SOA controller (SOAC) 180. These are formed of silicon electric integrated circuits (Si EIC, or Si Electric Integrated Circuits).

The laser diode controller (LDC) 150 includes a TIA (Trans-impedance Amplifier) 151, an ADC (analog-to-digital converter) 152, a logic circuit 153, and a DAC (digital-to-analog converter) 154. The ring modulator controller (RMC) 160 includes a TIA 161, an ADC 162, a logic circuit 163, a DAC 164, and a heater driver 165. The ring demultiplexer controller (RDC) 170 includes a TIA 171, an ADC 172, a logic circuit 173, a DAC 174, and a heater driver 175. The SOA controller (SOAC) 180 includes a TIA 181, an ADC 182, a logic circuit 183, and a DAC 184.

In the present embodiment, wavelength adjustment in the ring resonator 121 of the ring modulator (RM) 120 is done by a heater formed nearby, which is controlled by the heater driver 165 that generates a current to be applied to heat the heater. Also, wavelength adjustment in the ring resonator 131 of the ring demultiplexer (RD) 130 is done by a heater nearby, which is controlled by the heater driver 175 that generates a current to be applied to heat the heater.

A light signal detected by a photodetector (PD) 122 provided in the ring modulator (RM) 120 is converted into a current value by the photodetector (PD) 122, and converted into a voltage value by the TIA 161 in the ring modulator controller (RMC) 160. The converted voltage value is digitized by the ADC 162, processed by the logic circuit 163 for controlling, then, converted into an analog signal by the DAC 164, and based on the analog signal, the amount of power supplied to the heater is controlled by the heater driver 165.

Also, a light signal detected by a photodetector (PD) 132 provided in the ring demultiplexer (RD) 130 is converted into a current value by the photodetector (PD) 132, and converted into a voltage value by the TIA 171 in the ring demultiplexer controller (RDC) 170. The converted voltage value is digitized by the ADC 172, processed by the logic circuit 173 for controlling, then, converted into an analog signal by the DAC 174, and based on the analog signal, the amount of power supplied to the heater is controlled by the heater driver 175.

In the present embodiment, the ring modulator controller (RMC) 160 and the ring demultiplexer controller (RDC) 170 have control modes illustrated in FIG. 18. The control modes are generally classified into an ECM (External Control Mode) and an ICM (Internal Control Mode).

The ECM is a mode in which a controller such as an MCU (Micro Control Unit) 190 other than the ring modulator controller (RMC) 160 and the ring demultiplexer controller (RDC) 170 sets an output value in the heater. The ICM is a mode in which a controller autonomously determines an output value for the heater based on a value detected by the photodetector (PD) 122 or 132 without the MCU 190.

The ICM includes three types of modes, or, a peaking ICM, a fixed value ICM, and an avoidance ICM, which correspond to the peaking control, the fixed value control, and the avoidance control, respectively. Namely, the peaking ICM is a mode to apply feedback to the heater to maximize the monitor value. The fixed value ICM is a mode to apply feedback to the heater to make the monitor value constant. The avoidance ICM is a mode to apply feedback to the heater to reduce the monitor value. A circuit that realizes these three types of ICMs is implemented in the ring modulator controller (RMC) 160 and the ring demultiplexer controller (RDC) 170 in the EIC.

In the present embodiment, generation of a PPM is mainly executed by the MCU 190. For example, the MCU 190 controls the laser diode controller (LDC) 150 so that only one laser diode (LD) 110 emits light. At the same time, the MCU 190 sets the ring modulator (RM) 120 into the ECM, and based on a sweep signal of a heater setting value output from the MCU 190, a heater output signal of the ring modulator (RM) 120 is swept.

The MCU 190 detects a peak while monitoring the value of the light strength detected by the photodetector (PD) 122 and output from the ring modulator controller (RMC) 160, and records the heater output signal at the peak in a modulator PPM 191 stored in a memory of the MCU 190. After that, in order to correct thermal crosstalk or to avoid cutting off the laser light, the MCU 190 sets the ring modulator controller (RMC) 160 into the peaking ICM or the avoidance ICM. The above control can be applied not only to the ring modulator (RM) 120, but also to the ring demultiplexer (RD) 130 similarly. In this case, the MCU 190 records the heater output signal at the peak in a demultiplexer PPM 192 stored in the memory of the MCU 190.

Ninth Embodiment

Figure 19:
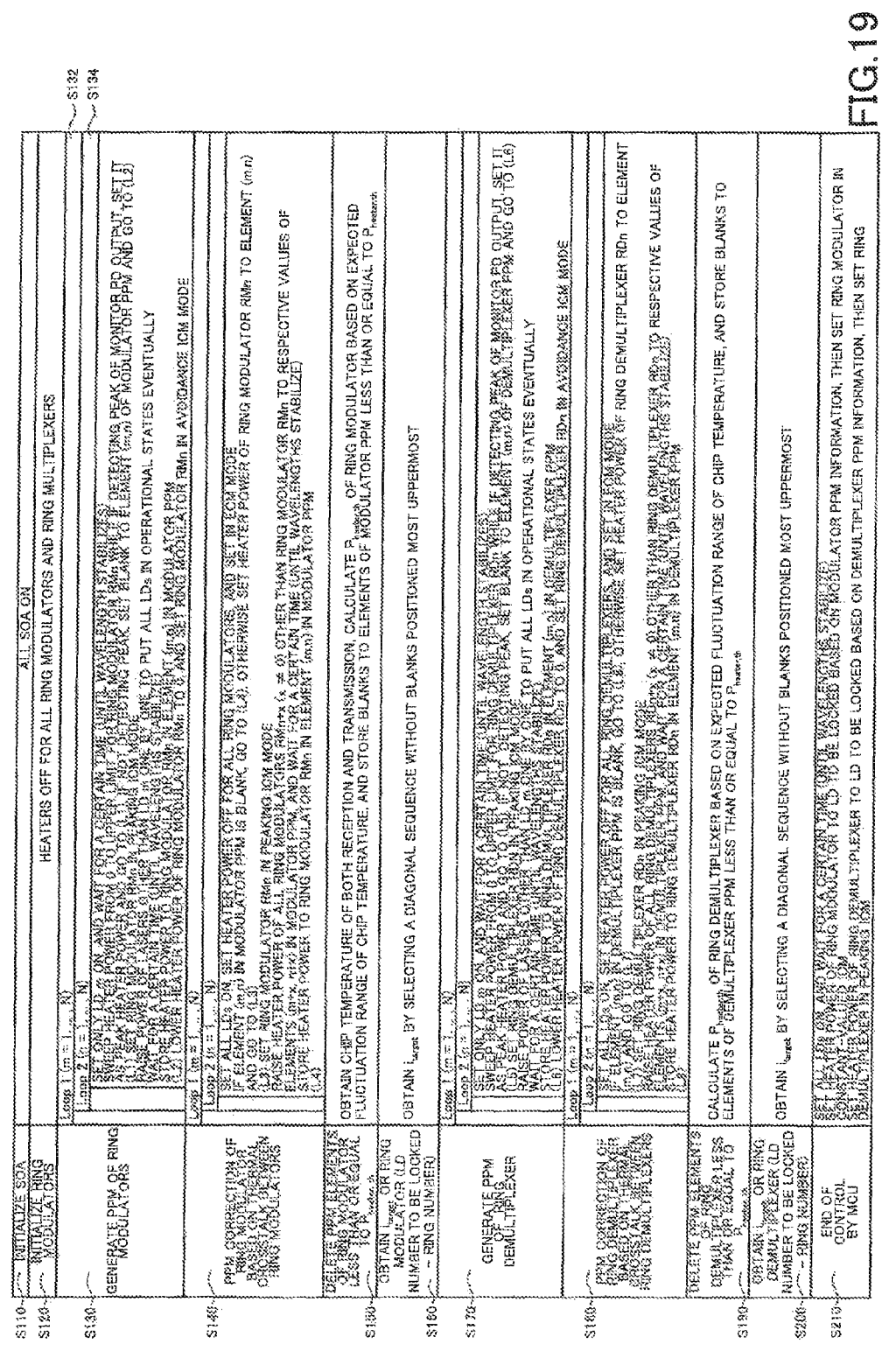

Next, a ninth embodiment will be described. FIG. 19 illustrates an example of a control sequence in the present embodiment. The control sequence in FIG. 19 is for a case where a WDM link is configured using a ring modulator and a ring demultiplexer together, and correction for thermal crosstalk is performed. Note that only one of the ring modulator and the ring demultiplexer may be used, and a part of the sequence for thermal crosstalk correction may be excluded if no thermal crosstalk exists.

Based on FIG. 19, the control sequence will be described according to the present embodiment.

First, at Step S110, the control initializes SOAs. Specifically, the control sets all SOAs on.

Next, at Step S120, the control initializes the ring resonator. Specifically, the control sets heaters of the ring modulator and ring demultiplexer off.

Next, at Step S130, the control generates a PPM of the ring modulator. Specifically, after having only the laser diode LDm set on, the control waits for a certain time in this state to allow the wavelength of the laser light emitted from the laser diode LDm to stabilize. After that, the control detects the light strength by the photodetector 36 working as a monitor while sweeping the heater power from 0 to an upper limit in the ring modulator RMn. If a peak of the light strength is detected by the photodetector 36, the control stores the value of the electric power corresponding to the peak of the light strength, and goes to L1. On the other hand, if a peak of the light strength is not detected by the photodetector 36, the control sets the element (m, n) of the ring modulator PPM blank, and goes to L2.

At L1, the control sets the ring modulator RMn into the peaking ICM, and sets laser diodes other than the laser diode LDm into an operational state one by one to raise power, and eventually, sets all the laser diodes into operational states. After that, the control waits for a certain time in this state to allow the wavelength of the laser light emitted from the laser diode LDm to stabilize. After that, the control stores the value of the electric power corresponding to the peak of the light strength in the element (m, n) of the ring modulator PPM as the value of the amount of electric power $P_{peak}$ supplied to the heater 34.

At L2, the control causes the electric power supplied to the heater 34 of the ring modulator RMn to be reduced to 0, and sets the ring modulator RMn into the avoidance ICM.

At Step S130, the control repeats the above process as a loop 2 for n=1, . . . , N in order, and a loop 1 for m=1, . . . , N in order. Note that Step S130 corresponds to the control described in the first embodiment.

Next, at Step S140, the control performs the ring modulator PPM correction based on thermal crosstalk among the ring modulators. The correction is performed once or multiple times. Specifically, the control sets all laser diodes LD1, LD2, . . . , LDN on, sets the electric power supplied to the heaters of all ring modulators RM1, RM2, . . . , RMN off, and sets them into the ECM. If the element (m, n) in the ring modulator PPM is blank, the control goes to L4 to end. On the other hand, if the element (m, n) in the ring modulator PPM is not blank, the control sets the electric power supplied to the heater of the ring modulator RMn to the element (m, n), and goes to L3.

At L3, the control sets the ring modulator RMn into the peaking ICM, and sets the electric power supplied to the heaters of all ring modulators other than the ring modulator RMn to the values of the elements of the ring modulator PPM corresponding to the respective ring modulators. After that, the control waits for a certain time in this state to make the resonance wavelength stabilize. After that, the control stores the value of the amount of electric power $P_{peak}$ supplied to the heater 34, which corresponds to the peak value of the light strength detected by the photodetector 36 of the ring modulator RMn, in the element (m, n) of the ring modulator PPM.

At Step S140, the control repeats the above process as a loop 2 for n=1, N in order, and a loop 1 for m=1, N in order. Note that Step S140 corresponds to the control described in the fourth embodiment.

Next, at Step S150, the control deletes elements in the ring modulator PPM that are less than or equal to $P_{heater,th}$. Specifically, the control obtains chip temperatures of both reception and transmission chips, calculates $P_{heater,th}$ of the ring modulator based on expected fluctuation ranges of the chip temperatures, and stores blanks to elements of the ring modulator PPM having values less than or equal to $P_{heater,th}$. Note that Step S150 corresponds to the control described in the fourth embodiment.

Next, at Step S160, the control obtains $i_{target}$ (=number m of the laser diode LDm to be locked-number n of the ring modulator RMn). Specifically, the control obtains $i_{target}$ by selecting a diagonal sequence positioned uppermost among diagonal sequences without blanks. Note that Step S160 corresponds to the control described in the first embodiment.

Next, at Step S170, the control generates a PPM of the ring demultiplexer. Specifically, after having only the laser diode LDm set on, the control waits for a certain time in this state to allow the wavelength of the laser light emitted from the laser diode LDm to stabilize. After that, the control detects the light strength by the photodetector 45 working as a monitor while sweeping the electric power supplied to the heater 43 of the ring demultiplexer RDn from 0 to an upper limit. If a peak of the light strength is detected by the photodetector 45, the control stores the value of the electric power corresponding to the peak of the light strength, and goes to L5. On the other hand, if a peak of the light strength is not detected by the photodetector 45, the control sets the element (m, n) of the ring demultiplexer PPM blank, and goes to L6.

At L5, the control sets the ring demultiplexer RDn into the peaking ICM, and sets the laser diodes other than the laser diode LDm into an operational state one by one to raise power, and eventually, sets all the laser diodes into operational states. After that, the control waits for a certain time in this state to allow the wavelength of the laser light emitted from the laser diode LDm to stabilize. After that, the control stores the value of the electric power corresponding to the peak of the light strength in the element (m, n) of the ring demultiplexer PPM as the value of the amount of electric power $P_{peak}$ supplied to the heater 43.

At L6, the control causes the electric power supplied to the heater 43 of the ring demultiplexer RDn to be reduced to 0, and sets the ring demultiplexer RDn into the avoidance ICM.

At Step S170, the control repeats the above process as a loop 2 for n=1, . . . , N in order, and a loop 1 for m=1, . . . , N in order. Note that Step S170 corresponds to the control described in the first embodiment.

Next, at Step S180, the control performs the ring demultiplexer PPM correction based on thermal crosstalk among the ring demultiplexers. The correction is performed once or multiple times. Specifically, the control sets all laser diodes LD1, LD2, . . . , LDN on, sets the electric power supplied to the heaters of all ring modulators RM1, RM2, . . . , RMN off, and sets them into the ECM. If the element (m, n) in the ring demultiplexer PPM is blank, the control goes to L8 to end. On the other hand, if the element (m, n) in the ring demultiplexer PPM is not blank, the control sets the electric power supplied to the heater of the ring demultiplexer RDn in the element (m, n), and goes to L7.

At L7, the control sets the ring demultiplexer RDn into the peaking ICM, and sets the electric power supplied to the heaters of all ring demultiplexers other than the ring demultiplexer RDn to the values of the elements of the ring demultiplexer PPM corresponding to the respective ring demultiplexers. After that, the control waits for a certain time in this state to allow the resonance wavelength to stabilize. After that, the control stores the value of the amount of electric power $P_{peak}$ supplied to the heater 43, which corresponds to the peak value of the light strength detected by the photodetector 45 of the ring demultiplexer RDn, in the element (m, n) of the ring demultiplexer PPM.

At Step S180, the control repeats the above process as a loop 2 for n=1, . . . , N in order, and a loop 1 for m=1, . . . , N in order. Note that Step S180 corresponds to the control described in the first embodiment.

Next, at Step S190, the control deletes elements in the ring demultiplexer PPM that are less than or equal to $P_{heater,th}$. Specifically, the control obtains chip temperatures of both reception and transmission chips, calculates $P_{heater,th}$ of the ring demultiplexer based on expected fluctuation ranges of the chip temperatures, and stores blanks in elements of the ring demultiplexer PPM having values less than or equal to $P_{heater,th}$. Note that Step S190 corresponds to the control described in the fourth embodiment.

Next, at Step S200, the control obtains i-target (=number m of the laser diode LDm to be locked–number n of the ring demultiplexer RDn). Specifically, the control obtains $i_{target}$ by selecting a diagonal sequence positioned uppermost among diagonal sequences without blanks in the ring demultiplexer PPM. Note that Step 200 corresponds to the control described in the first embodiment.

Next, at Step S210, the MCU completes the control. Specifically, the MCU sets all laser diodes LD1, LD2, . . . , LDN on, waits for a certain time in this state to allow the wavelengths of the laser lights emitted from the laser diodes LD1, LD2, . . . , LDN to stabilize. After that, based on the ring modulator PPM, the MCU sets the electric power supplied to the heater 34 of the ring modulator to the laser diode to be locked, and sets the ring modulator into the fixed-value ICM. Similarly, based on the ring demultiplexer PPM, the MCU sets the electric power supplied to the heater 43 of the ring demultiplexer to the laser diode to be locked, and sets the ring demultiplexer into the fixed-value ICM.

Thus, this concludes the control sequence according to the present embodiment.

In the above embodiment, automatic control of wavelength shift correction, which has been unsolved so far, can be implemented, and wavelength allocation can be performed that minimizes the power consumption of the wavelength adjustment mechanism. It is possible to deal with a case where the ring diameters of ring resonators are randomly ordered, and to perform the control even if thermal crosstalk exists among laser diodes, ring modulators, and/or ring demultiplexers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A control method of an optical element including
a plurality of light sources configured to emit lights having different wavelengths from each other, and
a plurality of ring modulators configured to be connected in cascade along a light waveguide,
wherein each of the ring modulators includes
a ring resonator, and
a wavelength adjustment electrode configured to adjust a resonance wavelength in the ring resonator,
wherein the lights emitted from the light sources are multiplexed to be incident on the light waveguide,
the method comprising:
having one of the light sources emit the light;
adjusting power to be supplied to the wavelength adjustment electrode in a corresponding one of the ring modulators, to obtain a value of the power causing the resonance wavelength of the ring resonator in the one of the ring modulators, to be equivalent to the wavelength of the light emitted from the one of the light sources;
obtaining a relationship between the light sources and the values of the power corresponding to the ring modulators; and
selecting the ring modulators corresponding to the light sources based on the relationship between the light sources and the values of the power.

2. The control method, as claimed in claim 1, wherein the number of the light sources is equivalent to the number of the ring modulators,
wherein the relationship between the light sources and the values of the power corresponding to the ring modulators is a matrix having rows representing either of the light sources or the ring modulators, and having columns representing the others,
wherein each element of the matrix stores the value of the power causing the resonance wavelength of the ring resonator in the one of the ring modulators, to be equivalent to the wavelength of the light emitted from the one of the light sources.

3. The control method, as claimed in claim 2, wherein when there exists the value of the power causing the resonance wavelength of the ring resonator in the one of the ring modulators, to be equivalent to the wavelength of the light emitted from the one of the light sources, the matrix has a corresponding element storing the value of the power, or when there does not exist the value of the power, the matrix has the corresponding element storing a blank,
the selecting selects one of an uppermost diagonal sequence and a lowermost diagonal sequence, among diagonal sequences without the blanks in the matrix.

4. The control method, as claimed in claim 3, the method further comprising:
exchanging an order of the light sources or the ring modulators when the matrix does not include a diagonal sequence without the blanks so that the matrix includes the diagonal sequence without the blanks.

5. The control method, as claimed in claim 3, the method further comprising:
storing a blank in an element in the matrix if the element has the value of the power less than or equal to a predetermined value.

6. The control method, as claimed in claim 1, wherein the ring resonator further includes a photodetector configured to detect the resonance wavelength,
wherein the adjusting adjusts the power in a corresponding one of ring demultiplexers to cause the resonance wavelength of the ring resonator in the one of the ring demultiplexers to be equivalent to the wavelength of the light emitted from the one of the light sources, by adjusting the power supplied to the wavelength adjustment electrode so that the value detected by the photodetector is maximized.

7. The control method, as claimed in claim 6, wherein the adjustment is performed in a state having two or more of the light sources emit light.

8. The control method, as claimed in claim 6, wherein the adjustment is performed in a state where two or more of the wavelength adjustment electrodes in the ring resonators have the power applied.

9. The control method, as claimed in claim 1, wherein the wavelength adjustment electrode changes a temperature in the ring resonator.

10. The control method, as claimed in claim 1, wherein each of the light sources is a light source configured to emit a laser light.

11. A control method of an optical element including
a plurality of light sources configured to emit lights having different wavelengths from each other, and
a plurality of ring demultiplexers configured to be connected in cascade along a light waveguide,
wherein each of the ring demultiplexers includes
a ring resonator, and
a wavelength adjustment electrode configured to adjust a resonance wavelength in the ring resonator,
wherein the lights emitted from the light sources are multiplexed to be incident on the light waveguide,
the method comprising:
having one of the light sources emit the light;
adjusting power to be supplied to the wavelength adjustment electrode in a corresponding one of the ring demultiplexers, to obtain a value of the power causing the resonance wavelength of the ring resonator in the one of the ring demultiplexers, to be equivalent to the wavelength of the light emitted from the one of the light sources;
obtaining a relationship between the light sources and the values of the power corresponding to the ring demultiplexers; and
selecting the ring demultiplexers corresponding to the light sources based on the relationship between the light sources and the values of the power.

12. The control method, as claimed in claim 11, wherein the number of the light sources is equivalent to the number of the ring demultiplexers,
wherein the relationship between the light sources and the values of the power corresponding to the ring demultiplexers is a matrix having rows representing either of the light sources or the ring demultiplexers, and having columns representing the others,
wherein each element of the matrix stores the value of the power causing the resonance wavelength of the ring resonator in the one of the ring demultiplexers, to be equivalent to the wavelength of the light emitted from the one of the light sources.

13. The control method, as claimed in claim 12, wherein when there exists the value of the power causing the resonance wavelength of the ring resonator in the one of the ring demultiplexers, to be equivalent to the wavelength of the light emitted from the one of the light sources, the matrix has a corresponding element storing the value of the power, or when there does not exist the value of the power, the matrix has the corresponding element storing a blank,
the selecting selects one of an uppermost diagonal sequence and a lowermost diagonal sequence, among diagonal sequences without the blanks in the matrix.

14. The control method, as claimed in claim 13, the method further comprising:
exchanging an order of the light sources or the ring demultiplexers when the matrix does not include a diagonal sequence without the blanks so that the matrix includes the diagonal sequence without the blanks.

\* \* \* \* \*